United States Patent
Kant et al.

(10) Patent No.: US 10,263,675 B2
(45) Date of Patent: Apr. 16, 2019

(54) METHOD AND DEVICE FOR EFFICIENT PRECODER SEARCH

(71) Applicant: Telefonaktiebolaget LM Ericsson (publ), Stockholm (SE)

(72) Inventors: Shashi Kant, Vallingby (SE); Sairamesh Nammi, Austin, TX (US); Goutam Ramamurthy, Bromma (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 15/529,077

(22) PCT Filed: Nov. 25, 2014

(86) PCT No.: PCT/EP2014/075548
§ 371 (c)(1),
(2) Date: May 23, 2017

(87) PCT Pub. No.: WO2016/082869
PCT Pub. Date: Jun. 2, 2016

(65) Prior Publication Data
US 2017/0264349 A1   Sep. 14, 2017

(51) Int. Cl.
*H04B 7/06* (2006.01)
*H04L 5/00* (2006.01)
(Continued)

(52) U.S. Cl.
CPC ......... *H04B 7/0465* (2013.01); *H04B 7/0417* (2013.01); *H04B 7/0486* (2013.01);
(Continued)

(58) Field of Classification Search
CPC ............................ H04B 7/0639; H04B 7/0626
See application file for complete search history.

(56) References Cited

U.S. PATENT DOCUMENTS

| | | | | |
|---|---|---|---|---|
| 2010/0118989 | A1* | 5/2010 | Sayana | H04L 5/0035 375/260 |
| 2011/0075746 | A1 | 3/2011 | Rheinschmitt et al. | |
| 2013/0028340 | A1* | 1/2013 | Yang | H04B 7/0623 375/260 |

FOREIGN PATENT DOCUMENTS

| EP | 2536083 A1 | 12/2012 |
|---|---|---|
| EP | 2557723 A1 | 2/2013 |
| WO | 2011074725 A1 | 6/2011 |

OTHER PUBLICATIONS

PCT International Search Report, dated Sep. 24, 2015, in connection with International Application No. PCT/EP2014/075548, all pages.

(Continued)

*Primary Examiner* — Ross Varndell
(74) *Attorney, Agent, or Firm* — Leffler Intellectual Property Law, PLLC

(57) ABSTRACT

The disclosure relates to a method performed in a wireless device for establishing a feedback metric. The wireless device is configured with a grouping of available precoding matrix indicators, PMIs, of a codebook, the grouping comprising two or more groups each of which comprises an exclusive subset of the available precoding matrix indicators, PMIs. The method comprises: identifying for one or more rank indicator, RI, hypotheses a respective parent PMI providing the highest link quality metric, LQM; establishing for one or more of the identified parent PMIs, a respective set of child PMIs; determining a link quality metric, LQM for each child PMIs of the established one or more sets of child PMIs; and establishing the feedback metric to be the child PMI having the highest link quality metric, LQM. The disclosure also relates to a wireless device, method in a network node, network node, computer programs and computer program products.

17 Claims, 12 Drawing Sheets

(51) Int. Cl.
  *H04W 52/02*   (2009.01)
  *H04W 72/04*   (2009.01)
  *H04W 72/08*   (2009.01)
  *H04B 17/336*  (2015.01)
  *H04B 7/0417*  (2017.01)
  *H04B 7/0456*  (2017.01)

(52) U.S. Cl.
  CPC ......... *H04B 7/0626* (2013.01); *H04B 7/0632* (2013.01); *H04B 7/0634* (2013.01); *H04B 7/0639* (2013.01); *H04B 7/0697* (2013.01); *H04B 17/336* (2015.01); *H04W 52/0212* (2013.01); *H04W 72/085* (2013.01); *H04L 5/0053* (2013.01); *H04W 72/0413* (2013.01); *H04W 72/0466* (2013.01); *Y02D 70/1244* (2018.01); *Y02D 70/1262* (2018.01); *Y02D 70/142* (2018.01); *Y02D 70/146* (2018.01); *Y02D 70/21* (2018.01); *Y02D 70/444* (2018.01)

(56) References Cited

OTHER PUBLICATIONS

PCT Written Opinion, dated Sep. 24, 2015, in connection with International Application No. PCT/EP2014/075548, all pages.
3GPP TSG RAN WG1 Meeting #61bis, R1-103595, Dresden, Germany, Jun. 28-Jul. 2, 2010, ZTE, Further Performance Evaluation of LTE-A DL MIMO with 2-Level codebook, 10 pages.

* cited by examiner

METHOD AND DEVICE FOR EFFICIENT PRECODER SEARCH

TECHNICAL FIELD

The technology disclosed herein relates generally to the field of multi-antenna wireless communication systems and in particular to establishing of feedback such as precoding matrix indicators and rank indicators in such systems.

BACKGROUND

Multiple Input Multiple Output (MIMO) technique is a technique that increases the performance in a wireless communication system and is an integral part of the $3^{rd}$ and $4^{th}$ generation wireless systems. 5G wireless systems will also employ very large MIMO systems (also known as massive MIMO systems) comprising hundreds of antennas.

In closed loop spatial multiplexing (SM) schemes a user equipment (UE) provides feedback on a channel between the UE and a node of the wireless system, e.g. an evolved NodeB (eNB) in case of a wireless system implementing Long Term Evolution, LTE, standard. Examples of such feedback in the LTE system comprise Channel Quality Indicator (CQI), Precoding Matrix Indicator (PMI) and rank indicator (RI). CQI indicates the current status of the channel quality, PMI indicates a preferred precoding matrix of a predefined codebook for use by the eNB and RI defines how many spatial layers, i.e. number of independent information streams, that the UE is able to decode.

The performance of the closed loop MIMO system generally improves with the cardinality (size) of the codebook. In general, finding the RI and PMI is cumbersome and involves many computations. For example in 4 Tx MIMO (4 transmitting antennas), the UE needs to search 64 precoding entities of the codebook in order to find the RI and PMI. Such search entails several drawbacks. The search is time consuming, increases power consumption and hence drains UE battery life. For the UE to be able to perform the search, it has to have a fast and powerful processing unit and memory capacity which increases the cost thereof.

SUMMARY

An object of the present disclosure is to solve or at least alleviate at least one of the above mentioned problems.

The object is according to a first aspect achieved by a method performed in a wireless device for establishing a feedback metric. The wireless device is configured with a grouping of available precoding matrix indicators (PMIs) of a codebook. The grouping comprises two or more groups, each of which comprises an exclusive subset of the available PMIs. The method comprises identifying for each of one or more rank indicator hypotheses a respective parent PMI of the two or more groups providing the highest link quality metric; establishing for one or more of the identified parent PMIs, a respective set of child PMIs; determining a link quality metric for each child PMIs of the established one or more sets of child PMIs; and establishing the feedback metric to be the child PMI having the highest link quality metric.

By means of the method the complexity of finding a suitable PMI is significantly reduced, while a percentage degradation compared to a prior art full search is almost zero. The battery life time of the wireless device may thereby be prolonged. Further, the hardware resources of the wireless device (e.g. processing units and memory) can be partly relieved and be freed to instead execute additional procedures, such as inter-RAT (Radio Access Technology) in parallel with. CSI estimation.

The object is according to a second aspect achieved by a wireless device for establishing a feedback metric. The wireless device is configured with a grouping of available precoding matrix indicators, PMIs, of a codebook. The grouping comprises two or more groups each of which comprises an exclusive subset of the available precoding matrix indicators, PMIs. The wireless device is configured to identify for each of one or more rank indicator hypotheses, a respective parent PMI of the two or more groups providing the highest link quality metric; establish for one or more of the identified parent PMIs, a respective set of child PMIs; determine a link quality metric, LQM for each child PMIs of the established one or more sets of child PMIs; and establish the feedback metric to be the child. PMI having the highest link quality metric.

The object is according to a third aspect achieved by a computer program for a wireless device for establishing a feedback metric. The computer program comprises computer program code, which, when executed in a processor of the wireless device causes the wireless device to perform the method as above.

The object is according to a fourth aspect achieved by a computer program product comprising a computer program as above and a computer readable means on which the computer program is stored.

The object is according to a fifth aspect achieved by a method performed in a network node for configuring a wireless device to provide a feedback metric. The method comprises generating a codebook subset restriction bitmap comprising a bitmap pattern indicating one element in a respective group each of which comprises an exclusive subset of all available precoding matrix indicators, PMIs, of a codebook; and configuring the wireless device with a grouping of the available precoding matrix indicators, PMIs, according to the generated bitmap pattern.

The object is according to a sixth aspect achieved by a network node for configuring a wireless device to provide a feedback metric. The network node is configured to generate a codebook subset restriction bitmap comprising a bitmap pattern indicating one element in a respective group each of which comprises an exclusive subset of all available precoding matrix indicators, PMIs, of a codebook; and configure a wireless device with a grouping of all available precoding matrix indicators, PMIs, according to the generated bitmap pattern.

The object is according to an seventh aspect achieved by a computer program for a network node for configuring a wireless device to provide a feedback metric. The computer program comprises computer program code, which, when executed in a processor of the network node causes the network node to perform the method as above.

The object is according to an eight aspect achieved by a computer program product comprising a computer program as above and a computer readable means on which the computer program is stored.

Further features and advantages of the present disclosure will become clear upon reading the following description and the accompanying drawings.

DETAILED DESCRIPTION

Figure 1:
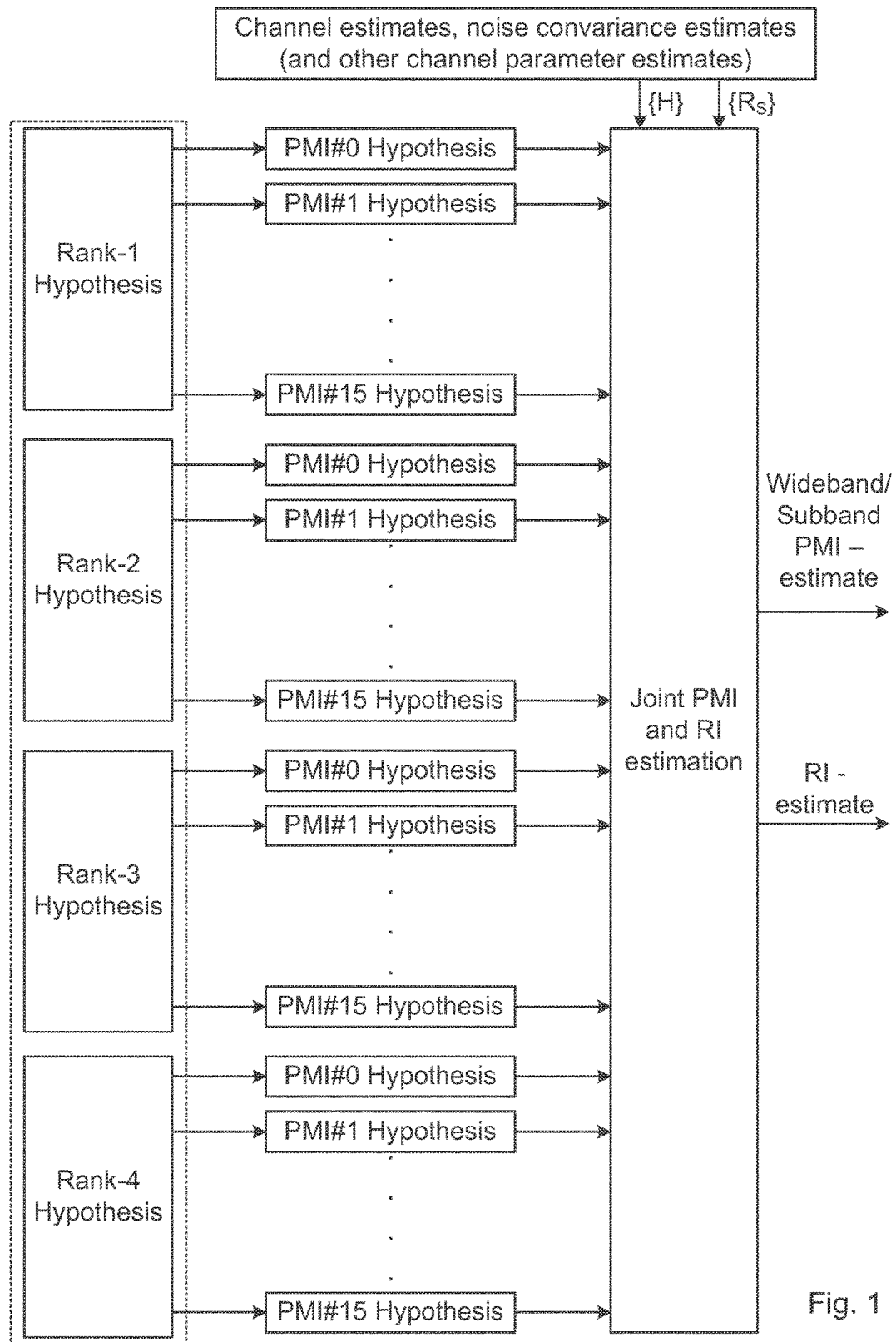
FIG. 1 illustrates a prior art search method for finding PMI and RI.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

In order to provide a thorough understanding of the present disclosure some additional details of known techniques are initially given. In relation to MIMO technique a conventionally used notation comprises $(N_t \times N_r)$, representing a MIMO configuration in terms of number of transmit $(N_t)$ and receive $(N_r)$ antennas. Common MIMO configurations used or currently discussed for various technologies comprise: (2×1), (1×2), (2×2), (4×2), (8×2) and (2×4), (4×4), (8×4), (8×8). The configurations represented by (2×1) and (1×2) are special cases of MIMO.

True MIMO comprising e.g. two transmitters and two receivers with independent information streams is also known as spatial multiplexing. Ideally, data capacity would then be doubled, but interference and other factors limit the achievable capacity increase. The spatial multiplexing (SM) scheme employs $N_L$ spatial layers such that the $N_L \leq \min(N_t, N_r)$. In SM technique, rank is equal to the $N_L$ spatial layers, the "rank" being a measure of the number of independent spatial layers (i.e. independent information streams).

In LTE/LTE-A systems, in a closed-loop SM scheme, a user-equipment (UE) feeds back the most suitable channel-state-information (CSI) depending on the channel conditions, and in particular, a rank indicator (RI), a (wideband/sub-band) channel quality indicator (CQI), and a (wideband/sub-band) precoding matrix indicator (PMI). This feedback is provided in order to maximize the effective throughput subject to conditions that the average block-error-rate (BLER) is below a given threshold, e.g. 10% (or depending on the quality-of-service).

Ideal linear precoding requires full CSI at the transmitter, which is typically possible only for time division duplex (TDD) based systems in which channel reciprocity is assumed. Ideal linear precoding is not practical for frequency division duplex (FDD) based systems. Codebook based precoding allows the receiver to explicitly identify a precoding matrix/vector that should be used for transmission, the precoding matrix/vector being based on a codebook known by transmitter and receiver.

In 3GPP LTE standard, separate codebooks are defined for various combinations of the number of transmit antennas and the number of transmission layers. The latter is also called rank information (RI). For example, total 64 precoding vectors and matrices are defined for 4 transmit antennas, as shown in Table 1 below. For each rank in the codebook for the scenarios of RI=1, 2, 3 and 4, 16 elements per rank are also defined.

TABLE 1

PMI codebook for 4 Tx antennas (refer to table 6.3.4.2.3-2 of TS36.211)

| Codebook index $u_n$ | | Number of layers u | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |

TABLE 1-continued

PMI codebook for 4 Tx antennas (refer to table 6.3.4.2.3-2 of TS36.211)

| Codebook index | $u_n$ | Number of layers u | | | |
|---|---|---|---|---|---|
| | | 1 | 2 | 3 | 4 |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

A prior art way of finding PMI and RI is described next, with reference to FIG. 1, which thus illustrates a prior art search method for finding PMI and RI.

This conventional RI/PMI selection algorithm is based on any considered link-quality-metric (LQM) utilizing e.g. mutual information, capacity etc. The LQM can be seen as a throughput informative. As mentioned earlier, in closed-loop SM, the UE needs to estimate a suitable CSI (e.g. CQI/PMI/RI), in order to maximize the throughput and simultaneously maintain the block-error-rate (BLER) constraint which can be mathematically described by a joint (integer) optimization problem:

$$\max_{CQI,PMI,RI} \text{Throughput}(CQI, PMI, RI) \quad (1)$$

$$\text{subject to } BLER \leq \text{Threshold}$$

Unfortunately, this joint (discrete/integer) optimization problem does not have any closed-form solution. Hence, a suitable PMI/RI is typically estimated independently of CQI; thereafter, a suitable CQI is estimated accordingly for the chosen PMI (and RI).

For example, considering a single-cell scenario having perfect time and synchronization, a received system model for (closed-loop) SM per sub-carrier (post-FFT) can be expressed as, $$Y = \underbrace{R_r^{1/2} H_{IID} R_t^{1/2}}_{H} W_{PMI} x + n \quad (2)$$

$$= H W_{PMI} x + n$$

Where, $Y \in \mathbb{C}^{Nr \times 1}$ corresponds to a received signal vector, and $H \in \mathbb{C}^{Nr \times Nt}$ describes an overall channel matrix incorporating the receiver correlation $R_r \in \mathbb{C}^{Nr \times Nr}$, IID/White MIMO channel matrix $H_{IID} \in \mathbb{C}^{Nr \times Nt}$ and transmitter spatial correlation $R_t \in \mathbb{C}^{Nr \times Nt}$. A complex zero-mean Gaussian noise vector $n \in \mathbb{C}^{Nr \times 1}$ is having covariance $R_n$. An unknown complex data/symbol vector is denoted by $x \in A^{Nr \times 1}$ (having normalized power $E\{xx^H\} = R_x = I$) corresponding to M-QAM (e.g. 64-QAM) constellation A. A (complex) precoder $W_{PMI} \in \Pi^{Nr \times N_L}$ is selected from a given/known codebook $\Pi$ having $N_\Pi$ number of precoders, where, PMI=$\{0, 1, \ldots -1\}$, for a given rank≤min$\{N_r, N_t\}$. Similar to the above data signal model (equation (2)), the received signal for channel estimation purpose can be modelled accordingly.

The post-processing SINR per $i^{th}$ spatial layer for a given PMI, assuming linear-MMSE detector employed at the receiver, reads:

$$SINR_i = \frac{1}{\left[\underbrace{(W_{PMI}^H H^H R_n^{-1} H W_{PMI} + I_{N_L})^{-1}}_{A}\right]_{i,i}} - 1 \quad (3)$$

where $[A]_{i,i}$ corresponds to an $i^{th}$ diagonal element of a matrix A.

In order to estimate a suitable PMI/RI, a so-called a link-quality metric (LQM), for instance mean mutual information, denoted mMI (per sub-band/wide-band) is computed, as given below, $$mMI(PMI, RI) = \left(\frac{1}{K \cdot \text{rank}}\right) \sum_{k=1}^{K} \sum_{i=1}^{RI=rank} I(SINR_i[k]) \quad (4)$$

where, I (SINR$_i$, [k]) is a mutual information that is a function of post-processing SINR$_i$[k] (and modulation alphabet A) as given in Table 2 below for $i^{th}$ spatial layer and $k^{th}$ resource-element. The number of resource-elements employed for the computation of the aforementioned LQM is given by a parameter K, that depends on the wide-band/sub-band PMI estimate.

TABLE 2

Mutual information for 4-QAM, 16-QAM and 64-QAM

| Modulation Alphabet A | Mutual information per symbol |
|---|---|
| 4-QAM | I (SINR$_i$) = J($\sqrt{4SINR_i}$) |
| 16-QAM | I (SINR$_i$) ≈ (½)J(0.8818$\sqrt{SINR_i}$) + (¼)J(1.6764$\sqrt{SINR_i}$) + (¼)J(0.9316$\sqrt{SINR_i}$) |
| 64-QAM | I (SINR$_i$) ≈ (⅓)J(1.1233$\sqrt{SINR_i}$) + (⅓)J(0.4381$\sqrt{SINR_i}$) + (⅓)J(0.4765$\sqrt{SINR_i}$) |

$$J(a) \approx \begin{cases} -0.04210610\ a^3 + 0.209252\ a^2 - 0.00640081\ a, & 0 < a < 1.6363 \\ 1 - \exp\left(\dfrac{0.00181491\ a^3 - 0.142675\ a^2 -}{0.08220540\ a + 0.0549608}\right), & 1.6363 < a < \infty \end{cases}$$

After having the estimate of mMI (per sub-band/wideband), it is possible to estimate the PMI and RI jointly employing unconstrained optimization which can be given as, $$\max_{PMI,RI} mMI(PMI, RI)$$

A capacity based LQM uses:

$$capacity(PMI, RI) = \left(\frac{1}{K \cdot rank}\right)\sum_{k=1}^{K}\sum_{i=1}^{RI=rank} \lambda \log_2(1 + SINR_i[k]) \quad (5)$$

In the capacity approach, the received SINR at the output of the MIMO detector (e.g. minimum mean-square error, MMSE, or maximum likelihood detection MLD detector)

FIG. 1 illustrates how PMI and RI are computed based on the mutual information approach, but the algorithm for finding RI/PMI is as follows for both LQMs calculations (equations (4) and (5)). There are, for each rank hypothesis (Rank-1, . . . , Rank-4), 16 PMI hypotheses (PMI#0, . . . , PMI#15) that could be paired with that particular rank to give best RI/PMI.

The UE estimates the channel via pilot, reference or data signals. Channel estimates, noise covariance estimates and other channel parameter estimates may be used, as indicated in FIG. 1 by {H} and {$R_n$}. Next, the post-processing SINR is computed for each entity in the precoding codebook. One entity is a certain rank hypothesis combined with one PMI hypothesis, e.g. Rank-1 hypothesis/PMI#0 hypothesis. The LQMs are then computed, either capacity or mutual-information of each entity using one of the aforementioned formulas (equation (4) or (5)). Finally, the PMI and the corresponding RI which maximizes the LQM is found. The result is then a wideband/subband PMI estimate and RI estimate, and the CQI is computed afterwards with this chosen PMI/RI pair.

It can be seen from both approaches that in order to find PMI/RI an exhaustive search of over the codebook elements is required. This involves many computations and is difficult to implement for the increasing number of codebook entries using the currently available hardware/software resources within a limited time budget (the UE sends the RI and PMI back to the eNB every transmission time interval (TTI) or every multiple of TTIs). The present disclosure provides a solution to this.

Figure 2:
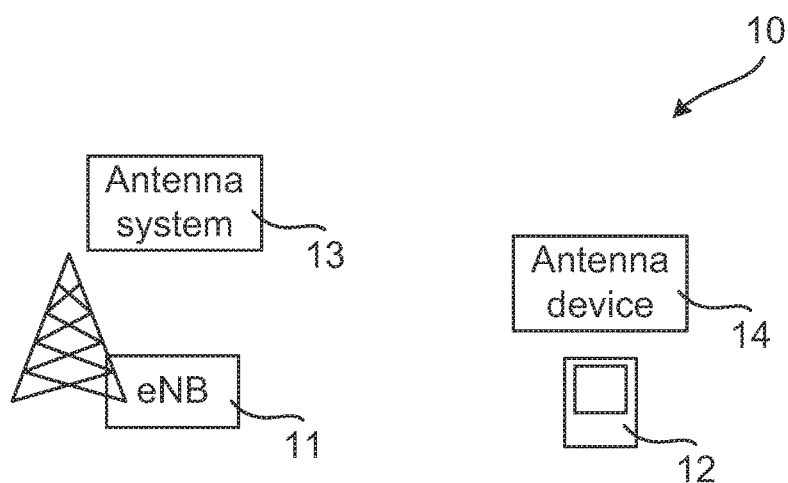
FIG. 2 illustrates schematically an environment in which embodiments of the present disclosure may be implemented.

FIG. 2 illustrates schematically an environment in which embodiments of the present disclosure may be implemented.

In the description, the term "radio network node" or simply "network node" is used for referring to any type of network node serving a UE and/or being connected to other network nodes or network elements or any radio node from which the UE receives signals. Examples of radio network nodes comprise Node B, base station (BS), multi-standard radio (MSR) radio node such as MSR BS, eNode B, network controller, radio network controller (RNC), base station controller (BSC), relay, donor node controlling relay, base transceiver station (BTS), access point (AP), transmission points, transmission nodes, RRU, RRII, nodes in distributed antenna system (DAS) etc. system. In FIG. 2, such network node is indicated at reference numeral 11.

The term user equipment (UE) 12 is used for referring to any type of wireless device communicating with a radio network node n in a cellular or mobile communication system 10. Examples of UE 12 comprise target device, device to device (D2D) UE, machine type UE or UE capable of machine to machine (M2M) communication, PDA, tablet computer, mobile terminals, smart phone, laptop embedded equipped (LEE), laptop mounted equipment (LME), USB dongles etc.

The network node 11 comprises or controls an antenna system 13. Likewise, the UE 12 comprises an antenna device 14. The antenna system 13 and the antenna device 14 are both MIMO enables, i.e. may for instance receive/transmit using multiple antennas. An antenna element used for transmission may be used for reception as well. The particular details of such antenna systems and antenna devices are not described in detail herein, but conventional such antennas may be used.

In the description, a 4×4 MIMO system is used for describing aspects of the disclosure, but it is noted that the teachings of this disclosure is equally applicable for instance for 8 TX, and in general for any Nt≥2Tx system wherein PMI and RI estimation is required. In the description, PMI is interchangeably defined as an index within a codebook or as a precoder matrix/vector itself depending on the context.

The embodiments are described in particular for closed-loop SM transmission scheme in LTE based systems. However, the embodiments are applicable to any radio access technology (RAT) or multi-RAT system in which the UE operates using closed-loop MIMO e.g., high speed downlink packet access (HSDPA), Wi-Fi/Wireless local area network (WLAN), Worldwide Interoperability for Microwave Access (WiMax), CDMA2000 (using code division multiple access) etc.

The embodiments are applicable to single carrier as well as to multicarrier (MC) or carrier aggregation (CA) operation of the UE in conjunction with MIMO in which the UE is able to receive and/or transmit data to more than one serving cell using MIMO. The term carrier aggregation (CA) is also denoted (e.g. interchangeably called) "multi-carrier system", "multi-cell operation", "multi-carrier operation", "multi-carrier" transmission and/or reception.

Briefly, the present disclosure provides, in various aspects, a method at the receiving node (UE 12) for estimating RI and the corresponding PMI for the chosen RI, a method at the transmission node (network node 11) for configuring an efficient and preferred code-book subset restriction bitmap assisting the UE 12 in reducing the complexity reduction in finding RI.

The above mentioned embodiments are described in the following.

The inventors of the present disclosure, have found a symmetrical structure of the codebook disclosed in Table 1 and realized a way of efficiently exploiting this for reducing the amount and complexity of PMI/RI calculations. In order to identify the relationship between the various precoding codebook elements, a parent PMI generator $u_p$ is defined from the codebook and a child PMI generator $u_c$. The child PMI generator $u_c$ is related to its parent PMI generator $u_p$ according to:

$$u_c = \begin{bmatrix} 1 & 0 & 0 & 0 \\ 0 & \exp(jk\theta) & 0 & 0 \\ 0 & 0 & \exp(j2k\theta) & 0 \\ 0 & 0 & 0 & \exp(j3k\theta) \end{bmatrix} u_p, \kappa = c - p, c \neq p,$$

$$\{c, p\} \in \{0, 1, \ldots 15\}, \theta = [-\pi, \pi].$$

As mentioned earlier, 4×4 MIMO is used for describing aspects of the present disclosure, and $\{c,p\} \in \{0,1,\ldots,15\}$ is true for this case. For larger MIMO systems, the set $\{0, 1, \ldots, n\}$ increases.

Figure 3:
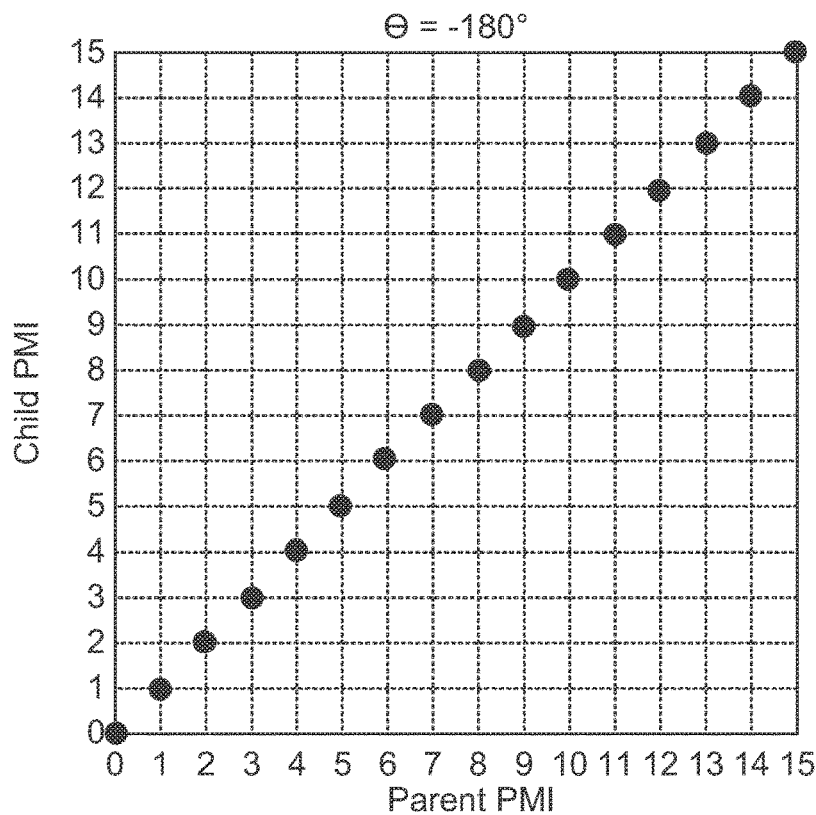
FIG. 3 illustrates a relationship between parent PMI and child PMI with −180 degrees phase shift.

FIG. 3 illustrates a relationship between a parent PMI and the child PMI with −180 degrees phase shift, i.e. shows the relation between child PMI and parent PMI when θ=−180°. It can be seen that with this angle, no child PMIs (besides the obvious child of parent PMI=child PMI) can be generated for a given parent PMI. For instance parent PMI=1 has only one child PMI, namely child PMI=1.

In an effort to find a way of reducing the number of calculations, this exercise was carried out with different values of θ. FIGS. 3-12 show the relation between parent PMI and child PMI for various values of θ.

Figure 4:
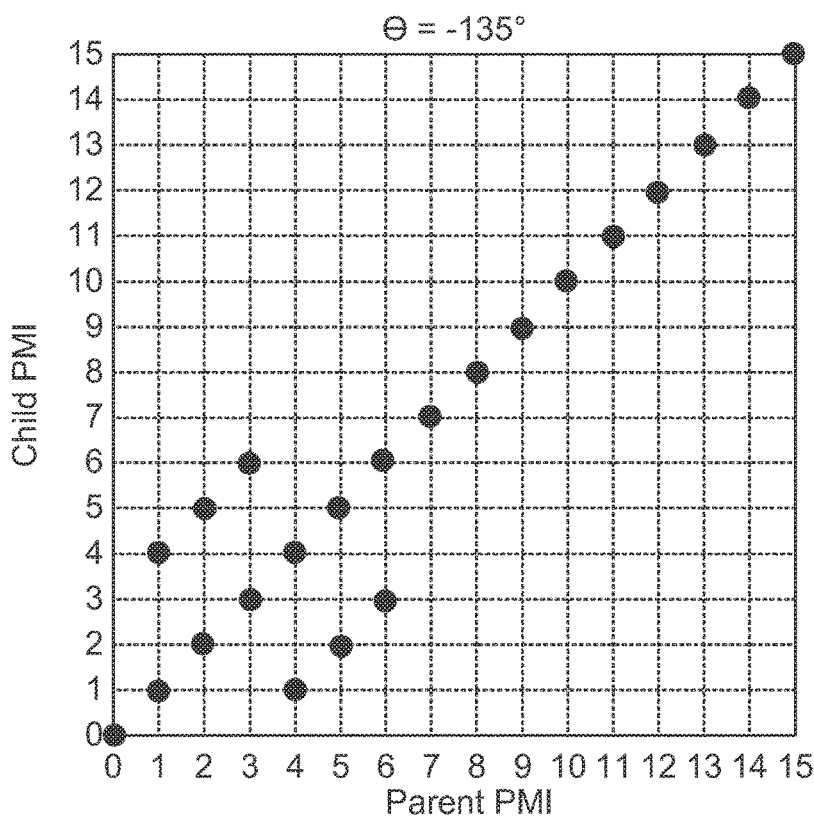
FIG. 4 illustrates a relationship between parent PMI and child PMI with −135 degrees phase shift.

FIG. 4 illustrates a relationship between parent PMI and child PMI with −135 degrees phase shift. For this case, some improvement was noted, in that some parent PMIs was found to have a "bonus" child PMI. For instance, for parent PMI equal to 1, was found to correspond to two child PMIs, namely child PMI 1 (obvious) and child PMI 4.

Figure 5:
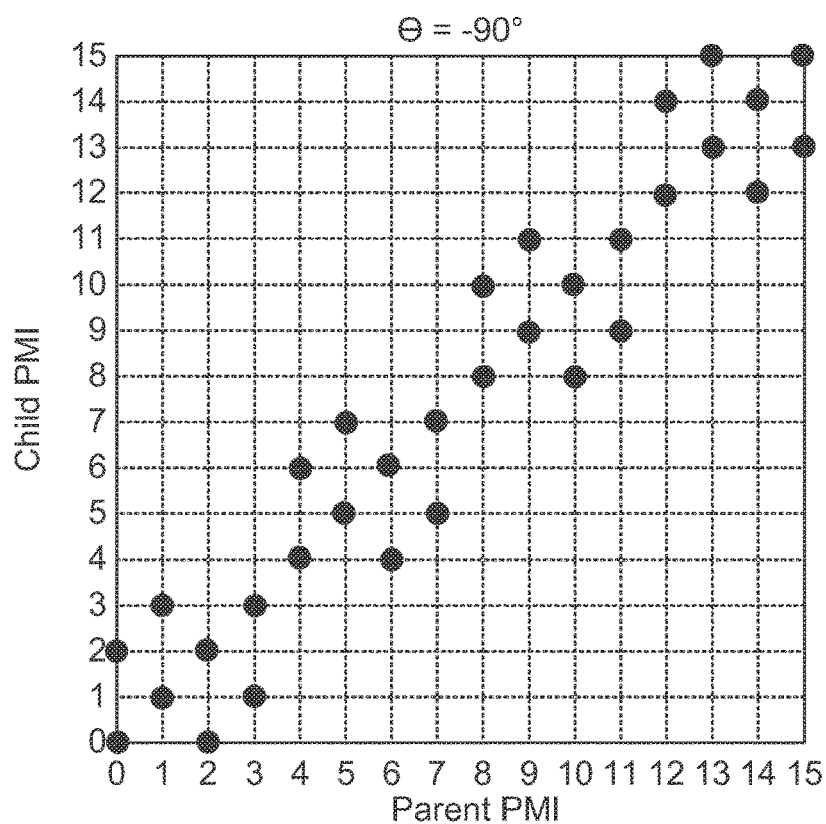
FIG. 5 illustrates a relationship between parent PMI and child PMI with −90 degrees phase shift.

FIG. 5 illustrates a relationship between parent PMI and child PMI with −90 degrees phase shift. This angle, −90 degrees, also revealed to relate some parent PMIs to more than its obvious child PMI. For instance, parent PMI=6 was found to have child PMIs 4 and 6.

Figure 6:
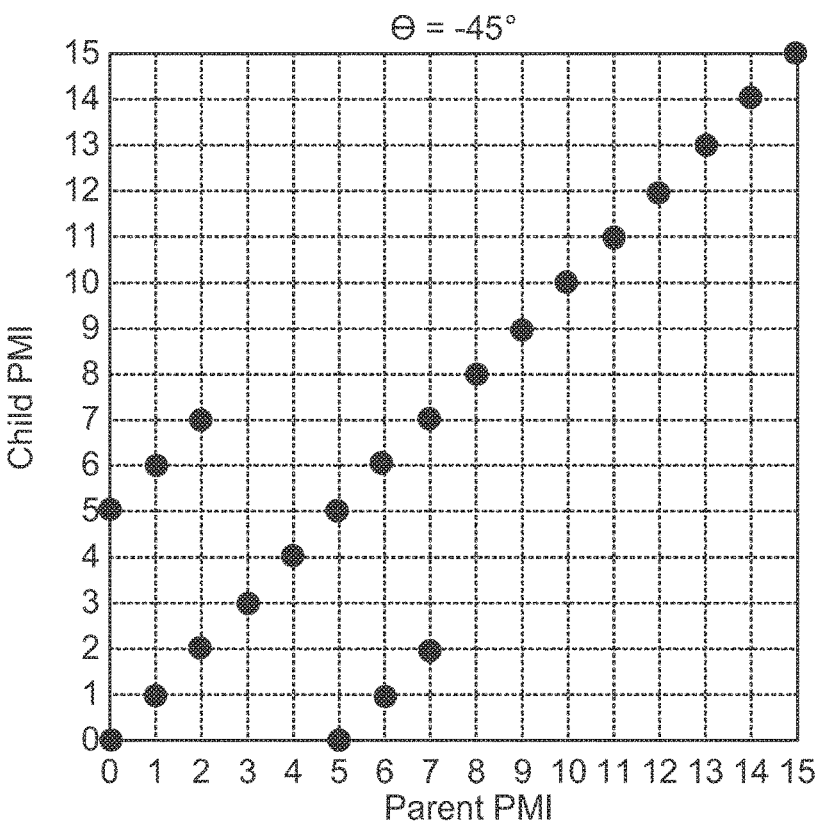
FIG. 6 illustrates a relationship between parent PMI and child PMI with −45 degrees phase shift.

FIG. 6 illustrates a relationship between parent PMI and child PMI with −45 degrees phase shift. Again, also this angle, −45 degrees, revealed to relate some parent PMIs to more than its obvious child PMI. For instance, parent PMI=7 was found to have child PMIs 2 and 7.

Figure 7:
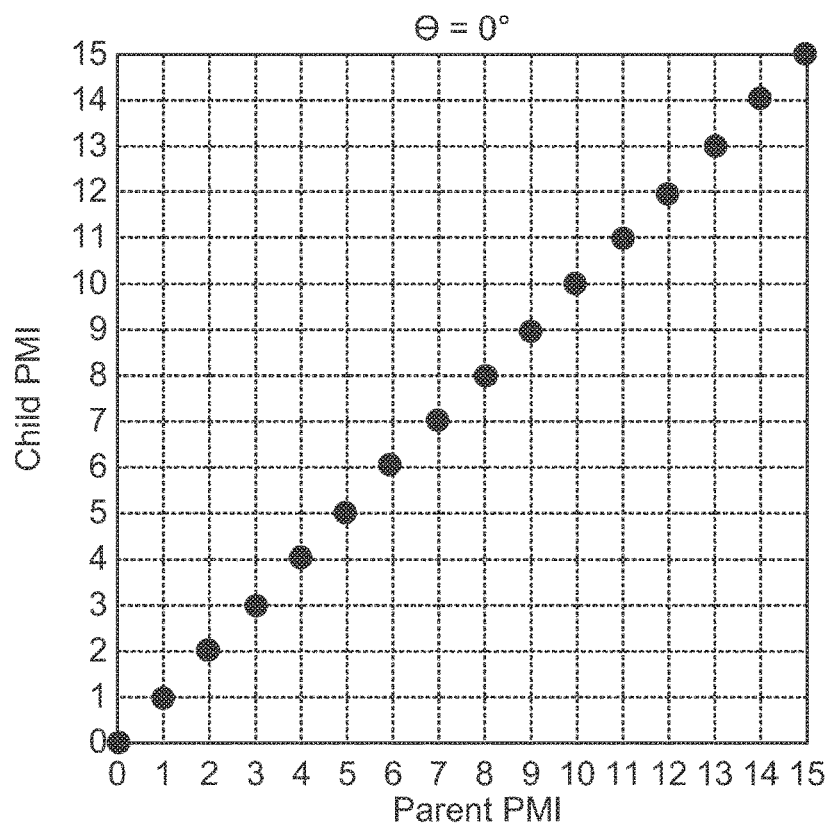
FIG. 7 illustrates a relationship between parent PMI and child PMI with 0 degrees phase shift.

FIG. 7 illustrates a relationship between parent PMI and child PMI with 0 degrees phase shift. This angle, 0 degrees, like the first case (−180 degrees) revealed no relationship between a parent PMI and a child PMI, besides the obvious child PMI.

Figure 8:
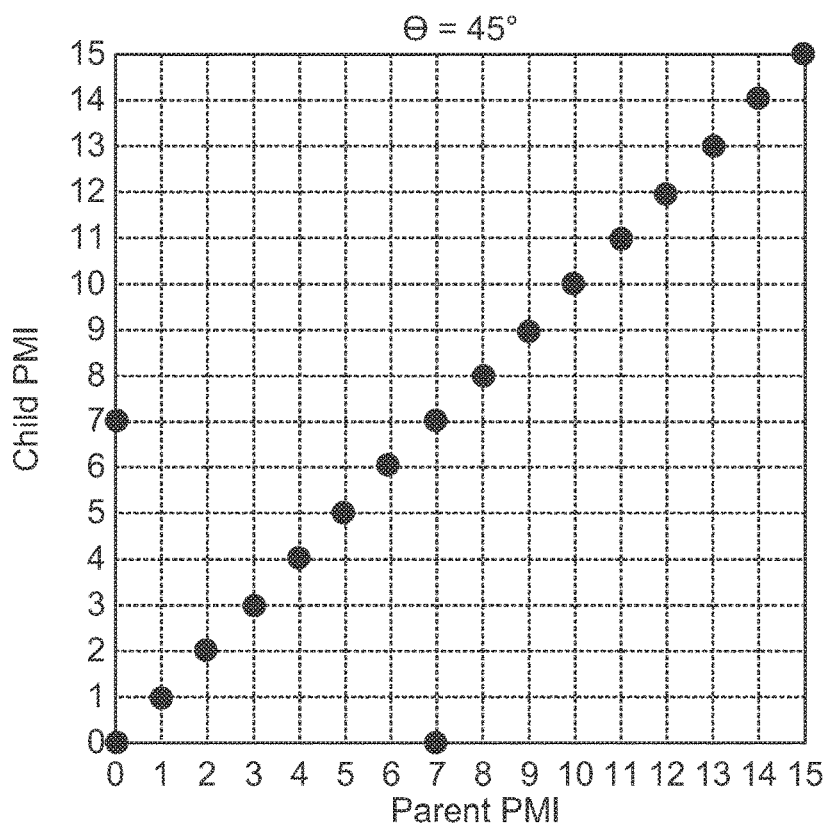
FIG. 8 illustrates a relationship between parent PMI and child PMI with 45 degrees phase shift.

FIG. 8 illustrates a relationship between parent PMI and child PMI with 45 degrees phase shift. This angle, 45 degrees, revealed to relate some parent PMIs, in particular parent PMIs 0 and 7 to more than its obvious child PMI, namely child PMIs 0, 7 and 7, 0, respectively.

Figure 9:
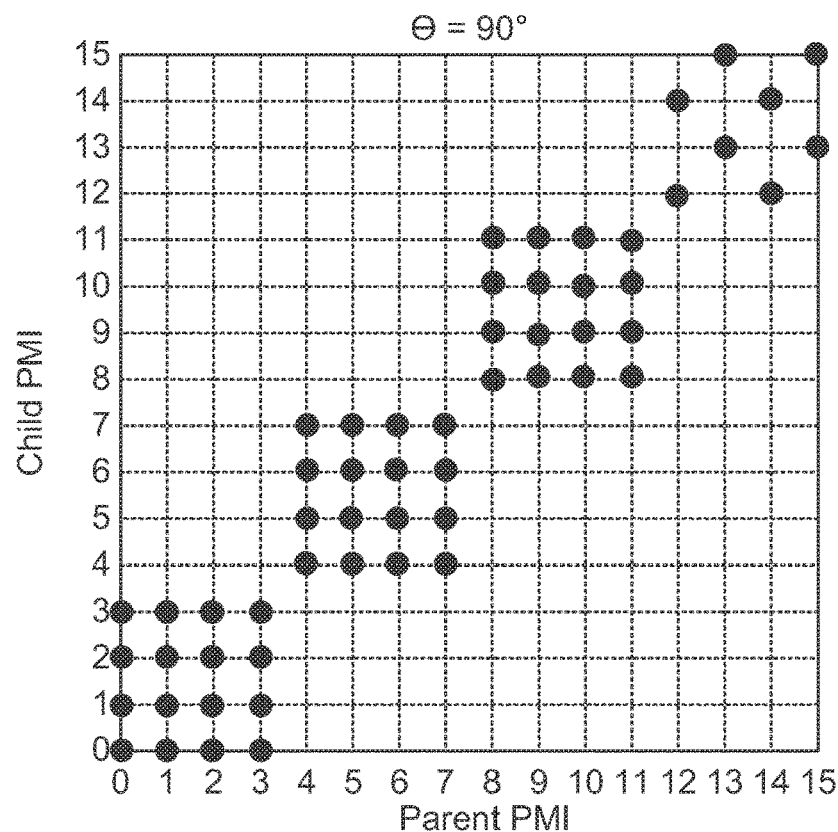
FIG. 9 illustrates a relationship between parent PMI and child PMI with 90 degrees phase shift.

FIG. 9 illustrates a relationship between parent PMI and child PMI with 90 degrees phase shift. For this angle, a larger number of child PMIs for each parent PMI was found. For instance, for parent. PMI=3, four child PMIs were found, namely 0, 1, 2, 3, and as another example, for parent PMI=11, four child PMIs were also found, namely 8, 9, 10, 11.

Figure 10:
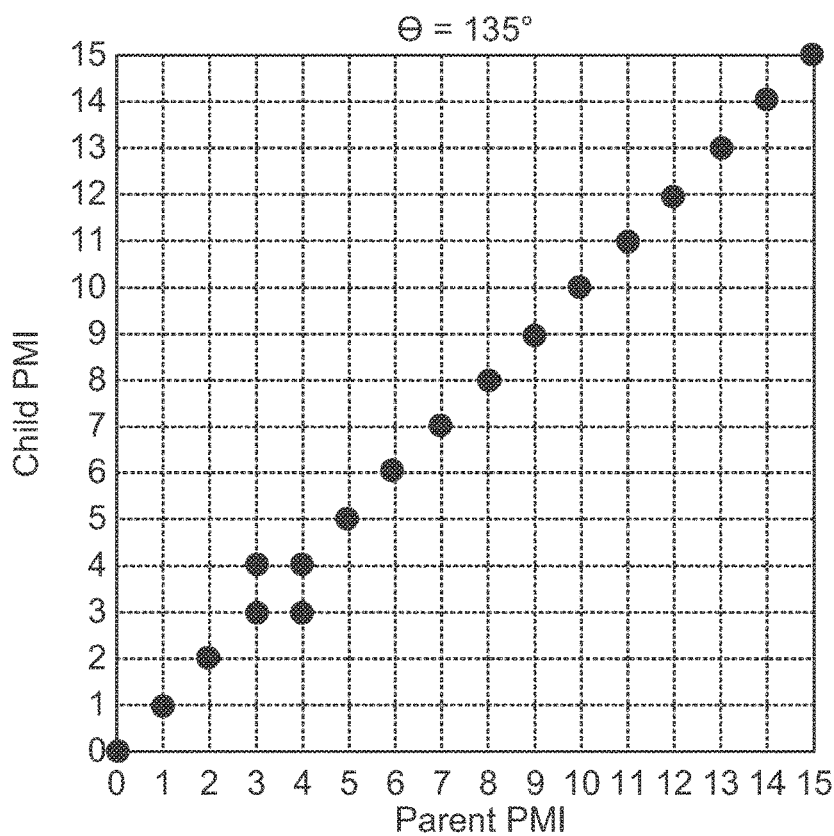
FIG. 10 illustrates a relationship between parent PMI and child PMI with 135 degrees phase shift.

FIG. 10 illustrates a relationship between parent PMI and child PMI with 135 degrees phase shift. This angle provided few parent PMIs related to more than its obvious child PMI, but for instance parent PMI was found to have child. PMIs 3 and 4.

Figure 11:
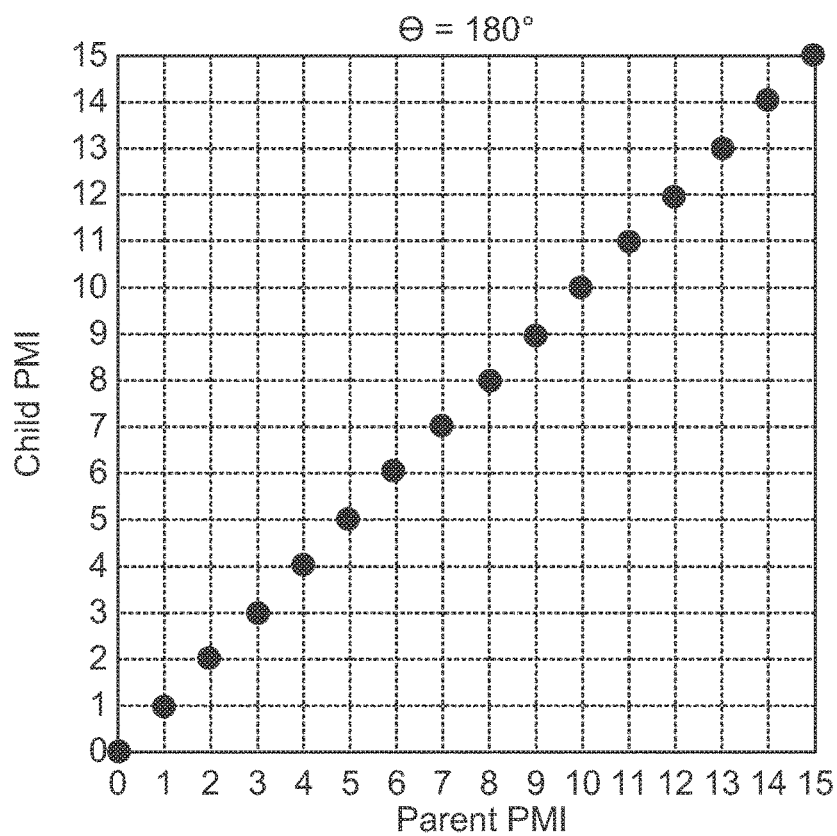
FIG. 11 illustrates a relationship between parent PMI and child PMI with 180 degrees phase shift.

FIG. 11 illustrates a relationship between parent PMI and child PMI with 180 degrees phase shift. This angle, 180 degrees, like the cases −180 degrees and 0 degrees revealed no relationship between a parent PMI and a child PMI, besides the obvious child PMI.

Figure 12:
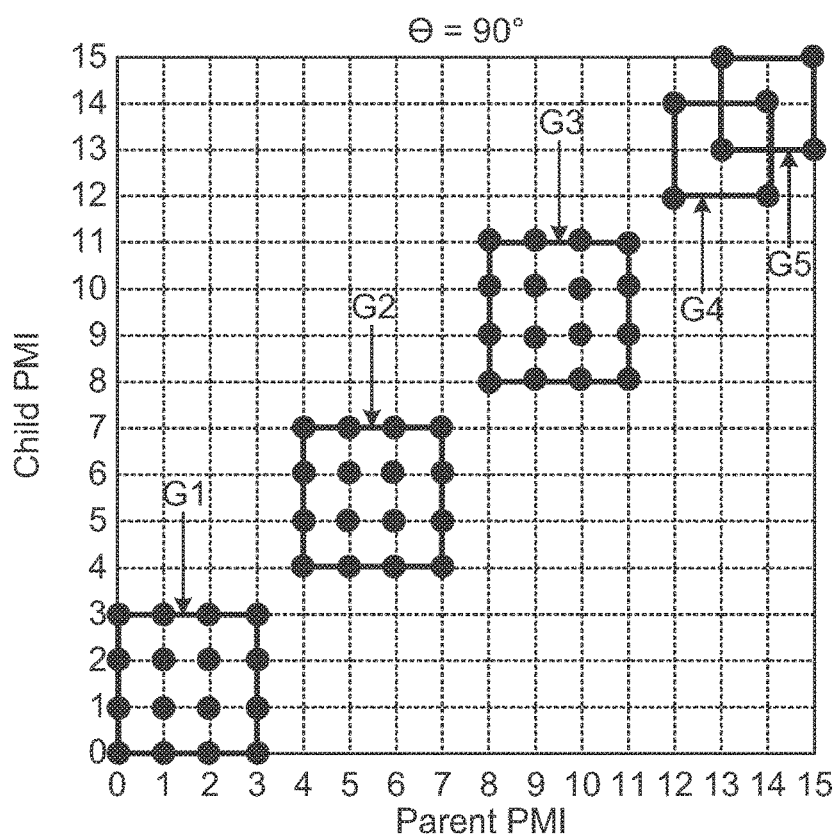
FIG. 12 illustrates a relationship between parent PMI and child PMI with 90 degrees phase shift and grouping of PMIs.

FIG. 12 illustrates a relationship between parent PMI and child PMI with 90 degrees phase shift and grouping of PMIs. For this angle, clear groupings can be seen For instance, a first group, indicated at reference numeral G1, comprises parent PMIs 0, 1, 2 and 3, each having the same set of child PMIs: 0, 1, 2 and 3. A second group G2 comprises parent PMIs 4, 5, 6, and 7, each parent PMI having the same set of child PMIs 4, 5, 6 and 7. A third group G3 comprises parent PMIs 8, 9, 10 and 11 and each parent PMI has the same set of child PMIs: 8, 9, 10 and 11. A fourth group G4 comprises parent PMIs 12 and 14, each parent PMI having the same set of child PMIs: 12 and 14. Finally, a fifth group G5 comprises parent PMIs 13 and 15, each parent PMI having the same set of child PMIs: 13 and 15.

Based on the studying of different angles and relationships (FIGS. 3-12), a table may be generated, showing how the parent PMIs are related to the child PMIs. Table 3 below summarizes the relation between the parent PMI and the child PMI (obvious child PMIs not included).

TABLE 3

| θ In degrees | Parent PMI index | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| −180 | — | — | — | — | — | — | — | — | — | — | — | — | — | — | — | — |
| −135 | — | 4 | 5 | 6 | 1 | 2 | 3 | — | — | — | — | — | — | — | — | — |
| −90 | 2 | 3 | 0 | 1 | 6 | 7 | 4 | 5 | 10 | 11 | 8 | 9 | 14 | 15 | 12 | 13 |
| −45 | 5 | 6 | 7 | — | — | 0 | 1 | 2 | — | — | — | — | — | — | — | — |
| 0 | — | — | — | — | — | — | — | — | — | — | — | — | — | — | — | — |
| 45 | 7 | — | — | — | — | — | — | 1 | — | — | — | — | — | — | — | — |
| 90 | 1, 2, 3 | 0, 2, 3 | 0, 1, 3 | 0, 1, 2 | 5, 6, 7 | 4, 6, 7 | 4, 5, 7 | 4, 5, 6 | 9, 10, 11 | 8, 10, 11 | 8, 9, 11 | 8, 9, 10 | 14 | 15 | 12 | 13 |
| 135 | — | — | — | 4 | 3 | — | — | — | — | — | — | — | — | — | — | — |
| 180 | — | — | — | — | — | — | — | — | — | — | — | — | — | — | — | — |

It can be observed that for θ=90° (compare FIG. 12 and related description), the highest number of child PMIs may be generated for a given parent PMI. This angle is therefore considered for grouping of the parent PMIs. Based on this grouping principle, the PMI codebook of Table 1 is grouped into 5 groups (G1, G2, G3, G4, G5) as shown in Table 4 below:

LQM. Any of the conventional methods for finding RI/PMI can be used, for example any of the methods outlined earlier. One appropriate parent PMI per rank hypothesis is obtained.

Having found a suitable parent-PMI per rank hypothesis, a suitable PMI and RI can be obtain jointly by performing the search within the child-PMIs of the survivor parent-PMIs (i.e. each parent PMI has the best LQM for a certain

| Codebook index (aka PMI) | $u_n$ | Family/ Group# | Parent-PMI generator |
|---|---|---|---|
| 0 | $u_0 = [1\ \ -1\ \ -1\ \ -1]^T$ | $G_1$ | $u_0 = [1\ \ -1\ \ -1\ \ -1]^T$ |
| 1 | $u_1 = [1\ \ -j\ \ 1\ \ j]^T$ | | |
| 2 | $u_2 = [1\ \ 1\ \ -1\ \ 1]^T$ | | |
| 3 | $u_3 = [1\ \ j\ \ 1\ \ -j]^T$ | | |
| 4 | $u_4 = [1\ \ (-1-j)/\sqrt{2}\ \ -j\ \ (1-j)/\sqrt{2}]^T$ | $G_2$ | |
| 5 | $u_5 = [1\ \ (1-j)/\sqrt{2}\ \ j\ \ (-1-j)/\sqrt{2}]^T$ | | $u_4 = \begin{bmatrix} 1 \\ (-1-j)/\sqrt{2} \\ -j \\ (1-j)/\sqrt{2} \end{bmatrix}$ |
| 6 | $u_6 = [1\ \ (1+j)/\sqrt{2}\ \ -j\ \ (-1+j)/\sqrt{2}]^T$ | | |
| 7 | $u_7 = [1\ \ (-1+j)/\sqrt{2}\ \ j\ \ (1+j)/\sqrt{2}]^T$ | | |
| 8 | $u_8 = [1\ \ -1\ \ 1\ \ 1]^T$ | $G_3$ | $u_8 = [1\ \ -1\ \ 1\ \ 1]^T$ |
| 9 | $u_9 = [1\ \ -j\ \ -1\ \ -j]^T$ | | |
| 10 | $u_{10} = [1\ \ 1\ \ 1\ \ -1]^T$ | | |
| 11 | $u_{11} = [1\ \ j\ \ -1\ \ j]^T$ | | |
| 12 | $u_{12} = [1\ \ -1\ \ -1\ \ 1]^T$ | $G_4$ | $u_{12} = [1\ \ -1\ \ -1\ \ 1]^T$ |
| 13 | $u_{13} = [1\ \ -1\ \ 1\ \ -1]^T$ | $G_5$ | $u_{13} = [1\ \ -1\ \ 1\ \ -1]^T$ |
| 14 | $u_{14} = [1\ \ 1\ \ -1\ \ -1]^T$ | $G_4$ | $u_{12} = [1\ \ -1\ \ -1\ \ 1]^T$ |
| 15 | $u_{15} = [1\ \ 1\ \ 1\ \ 1]^T$ | $G_5$ | $u_{13} = [1\ \ -1\ \ 1\ \ -1]^T$ |

$P_{PMI} = I_4 - (2u_{PMI}u_{PMI}^H/\|u_{PMI}\|^2)$, one may obtain the precoding matrix $W_{PMI}$ for different ranks by selecting/permuting the appropriate columns of matrix $P_{PMI}$ for the considered PMI.

Based on the above described grouping two methods, or two main embodiments of a single method, are provided for finding the RI and PMI, with reduced complexity of calculations compared to known methods. A two-step approach is used. In the first approach, the group is first identified and then a local search is used within a group to identify the best RI/PMI. In the second approach, the group and the RI are first identified, then a local search is used within the identified group/RI to obtain the PMI. The two approaches are described more in detail below, the first of which is denoted joint RI/PMI search and illustrated in FIG. 13, and the second of which is denoted joint group and RI search and is illustrated in FIG. 14.

Figure 13:
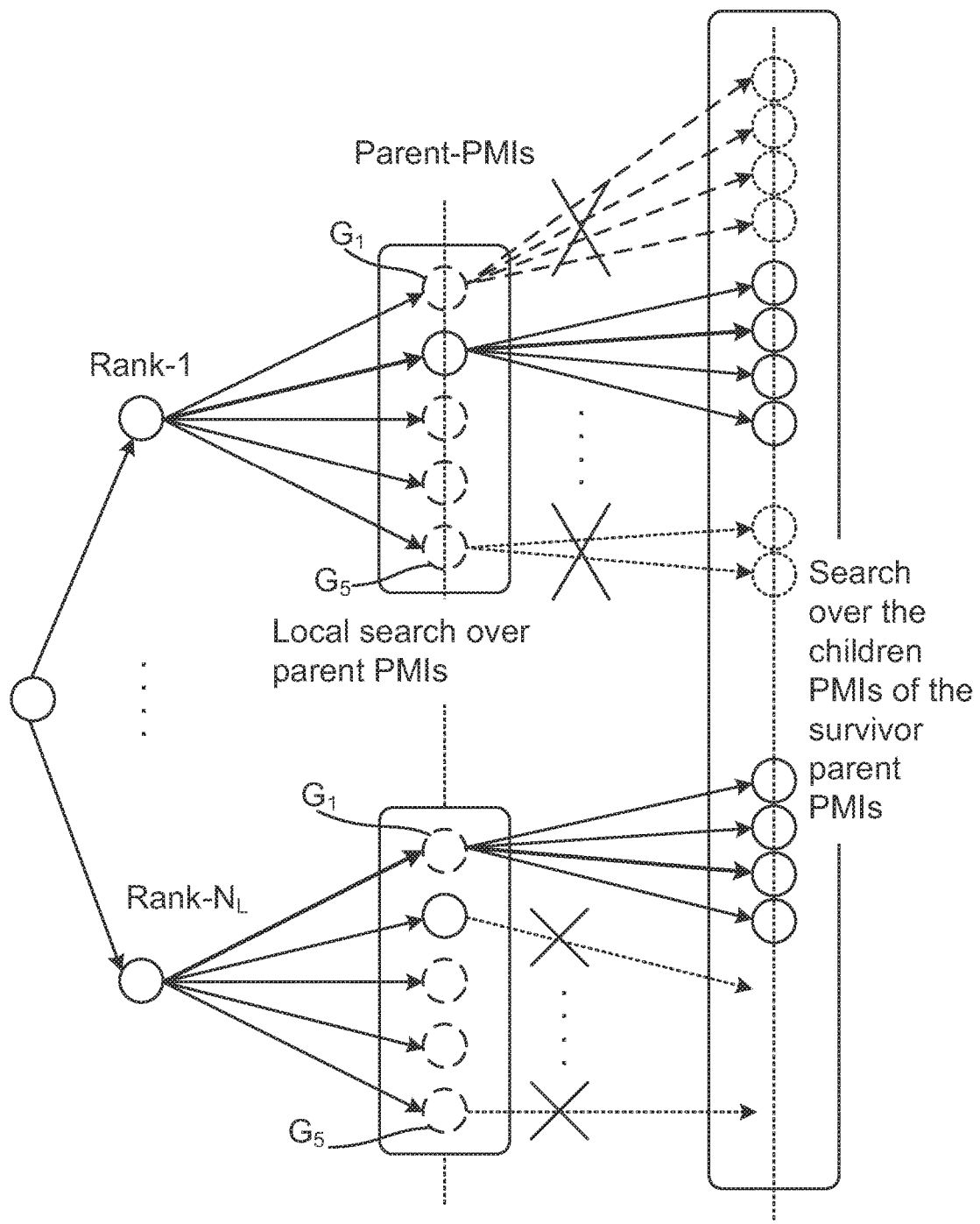
FIG. 13 is a pictorial view of an embodiment of the present disclosure.
Figure 14:
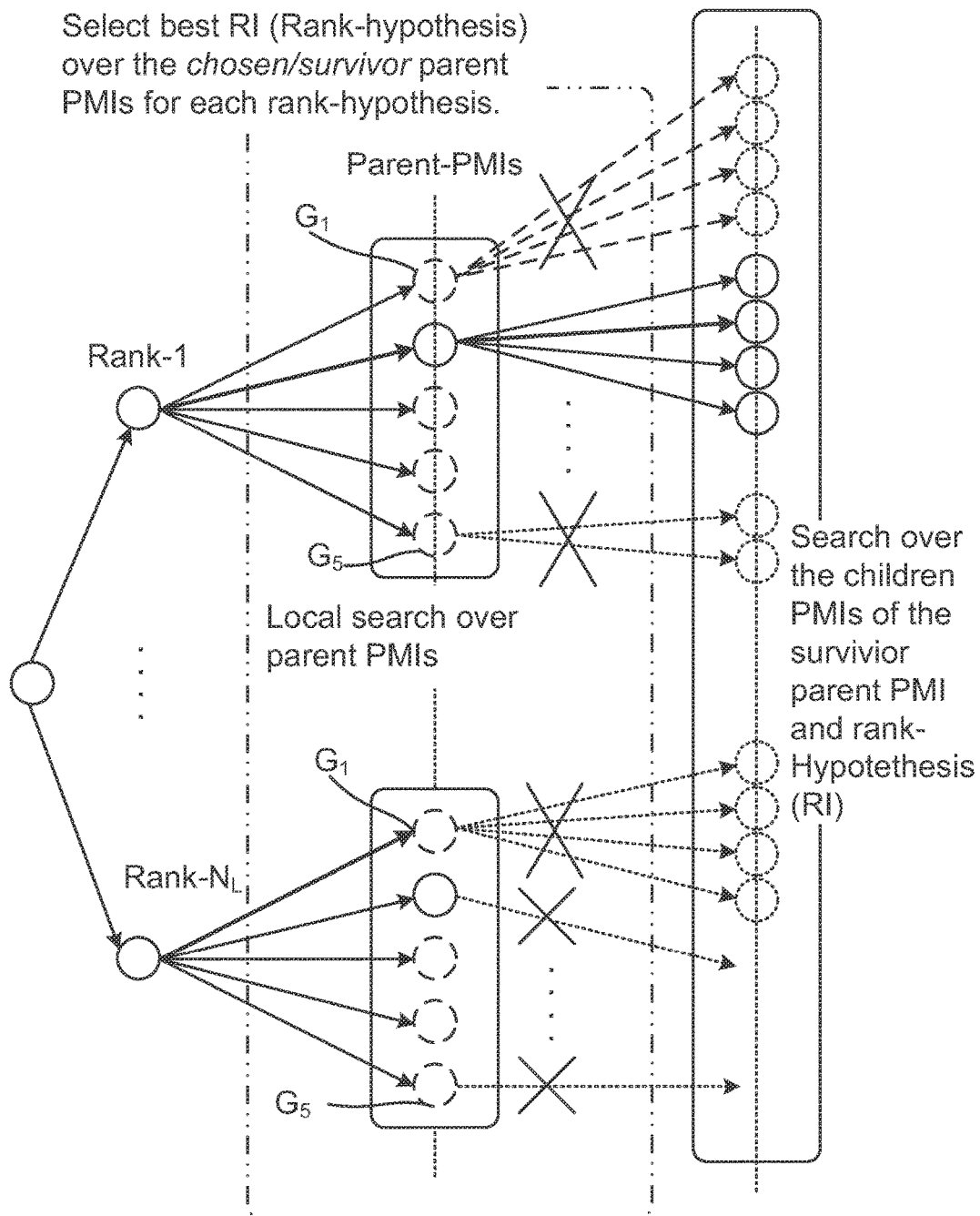
FIG. 14 is a pictorial view of an embodiment of the present disclosure.

FIG. 13 illustrates the joint RI/PMI search. In this embodiment, the best group G1, . . . , G5 is first identified for each rank. Each group comprises the precoding elements of the found groupings. For instance for the 4×4 MIMO case, for any rank hypothesis, there are 5 groups which are represented by an appropriate parent PMI corresponding to 0, 4, 8, 12 and 13 (or correspondingly 1, 5, 9, 14, 15). In other words, every rank hypothesis comprises 5 groups, where each group is represented by an appropriate parent PMI {0, 4, 8, 12, 13}, and every parent PMI comprises either 4 or 2 child including the parent PMI itself, depending on the particular parent PMI.

For each rank hypothesis a suitable parent PMI is thus to be found. This can be done by identifying the appropriate parent PMI among the groups G1, . . . , $G_N$ that (for this particular rank hypothesis) gives the best LQM. For instance, for rank-1 hypothesis, the parent PMI (among the five parent PMIs) that gives the best LQM is to be found. In the example of FIG. 13, the parent PMI indicated by a circle drawn with a non-broken line, is found to give the best rank hypothesis) This search is indicated in FIG. 13 by the arrows (four/two arrows) from each best parent PMI for each rank to the rightmost set of circles. For instance, for the best parent PMI for rank 1, the LQM for its child PMIs are determined. As a particular case, assuming that PMI=4 was found to be the best parent for rank 1, then the LQM for child PMIs 4, 5, 6, 7 are determined. The child PMI having the highest LQM is then selected for this RI=1 hypothesis. After having best or survivor child PMI for every rank hypothesis, a final search is performed over all the survivors within the rank hypothesis. This final search renders the best PMI and RI jointly which has maximal LQM among the survivors.

In the figure, the calculations needed according to prior art is also indicated. In particular, according to prior art, besides using all precoding elements 0,1, . . . , 15 per each rank 1, . . . , 4, for each such precoding element 0,1, . . . , 15 a number of calculations for establishing the best LQM were required. The circles among the rightmost circles drawn with dashed lines indicate the omitted calculations according to the present disclosure.

An algorithm implementing the above described joint RI and PMI approach may be as follows:

Step 1: Assuming a new cycle starts, the MEMO receiver estimates the channel from known pilots (and/or data).

Step 2: Compute the post-processing SINR from the parent PMIs from each group and for each rank.

Step 3: Compute the LQM (e.g. mutual information or capacity) from the computed SINR.

Step 4: Choose the group index for each rank which maximizes either the mutual information or the capacity.

Step 5: From the chosen group index compute the SINR of the child PMIs.

Step 6: Choose the best PMI and RI jointly within the chosen groups over all the rank hypotheses which maximizes either the mutual information or capacity.

Step 7: Report the computed parameters to the Node B.

Complexity Analysis:

It is noted that the minimum number of codebook elements needed for computing SINR is number of rank hypothesis*(number of groups+number of child PMI/selected group). Continuing the earlier example thus gives 4*(5+1)=24. In particular, 24 codebook elements are needed since 5 parent PMIs are needed for each of four ranks to find best parent PMI and then for the best case 1 codebook element is needed comprising the 2 child PMIs of the one best group (since one parent PMI is also considered as a child PMI: so effectively only 1 child PMI). The maximum number of codebook elements needed for computing SINR is 4*(5+3)=32. Hence the average number of codebook elements needed is 28. It can be observed that for full search the number of elements needed is 64. Hence a reduction of 37.5%, 50% and 43.75% in the best-case, worst-case and average-case complexity, respectively, compared to full search.

FIG. 14 illustrates the second approach, the joint group and RI search. The group index is identified a a first stage for each rank hypothesis, just like for the first approach. That is, for each rank, one of the groups G1, G2, G3, G4, G5 (refer to FIG. 12) is identified as the best. Each such group can be represented by a parent PMI, as explained earlier. For the case of 4×4 MIMO, four pairs of RI and best parent PMI group are obtained (e.g. RI 1, G2, wherein G2 can be represented by e.g. parent PMI 4). Unlike in the above first approach, a best RI can be selected by performing search over all the best groups (or best parent PMIs) for every rank hypothesis without selecting a best child PMI. For instance, the group/parent PMI and RI pair that maximizes an LQM. Now having the best parent PMI group and RI, the SINR for the corresponding child PMIs are determined. The child PMI having the best SINR is selected together with the corresponding RI.

Steps for implementing the Joint Group and RI Search algorithm may be as follows:

Step 1: Assuming a new cycle starts and the MIMO receiver estimates the channel from channel sounding.

Step 2: Compute the SINR for the parent PMIs from each group and for each rank.

Step 3: Compute the mutual information or capacity from the computed SINR.

Step 4: Choose the group/parent PMI and the best RI which maximizes either the mutual information or the capacity.

Step 5: From the chosen rank and the group index compute the SINR of the child PMIs.

Step 6: Choose the best PMI within the chosen group and rank which maximizes either the mutual information or capacity.

Step 7: Report the computed parameters to the Node B.

Complexity Analysis:

It is noted that minimum number of codebook elements needed for computing SINR is number of rank hypothesis*number of groups+number of child PMI/selected group/best RI, i.e. for this case 4*5+1=21. The maximum number of codebook elements needed for computing SINR is 4*5+3=23. Hence the average number of codebook elements needed is 22. It can be observed that for a full search the number of elements needed is 64, hence a reduction of 33%, 36% and 34% in the best-case, worst-case and average-case complexity, respectively, compared to the full search.

Figure 15:
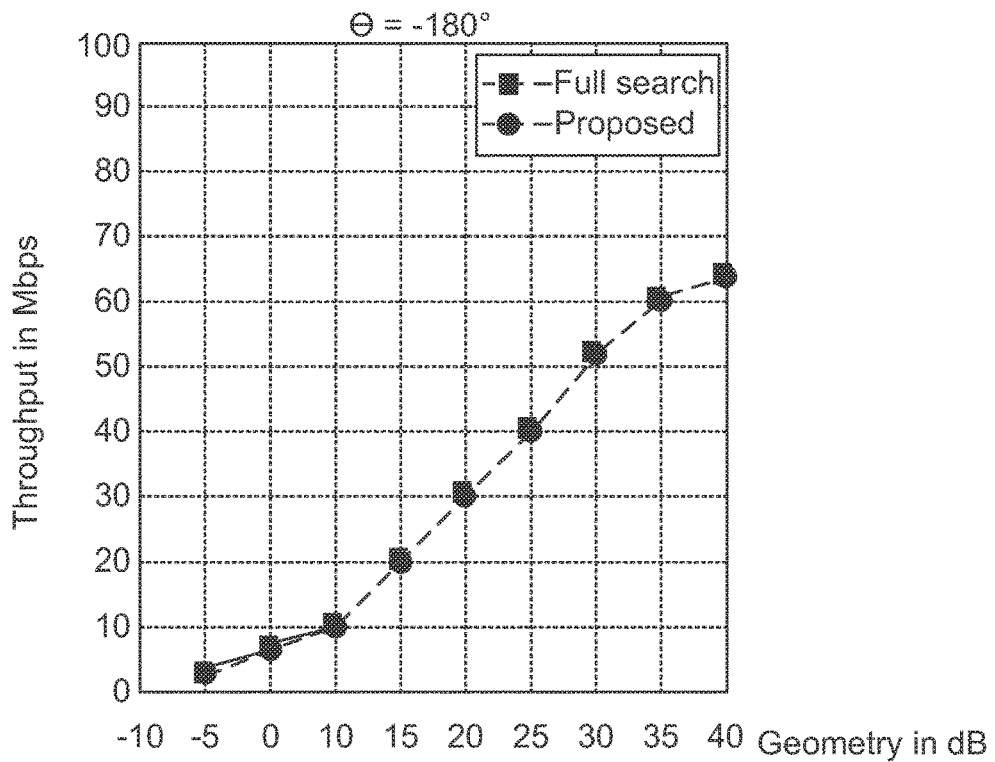
FIG. 15 is a graph illustrating a link simulation result.

FIG. 15 is a graph illustrating a link simulation result. The search according to the present disclosure is indicated by circles and dashed lines and the prior art full search is indicated by squares and non-broken lines (when not overlapping with the proposed search methods). Along the x-axis a geometry in decibels is indicated and along the y-axis corresponding throughput in Mega bits per second (Mbps) is indicated. It can be observed that the performance of the method according to the present disclosure is essentially equal to that of the prior art full search. A great saving of computations is thus achieved essentially without any decrease in throughput.

The various features that have been described may be combined in different ways, examples of which are given in the following with reference first to FIG. 16.

Figure 16:
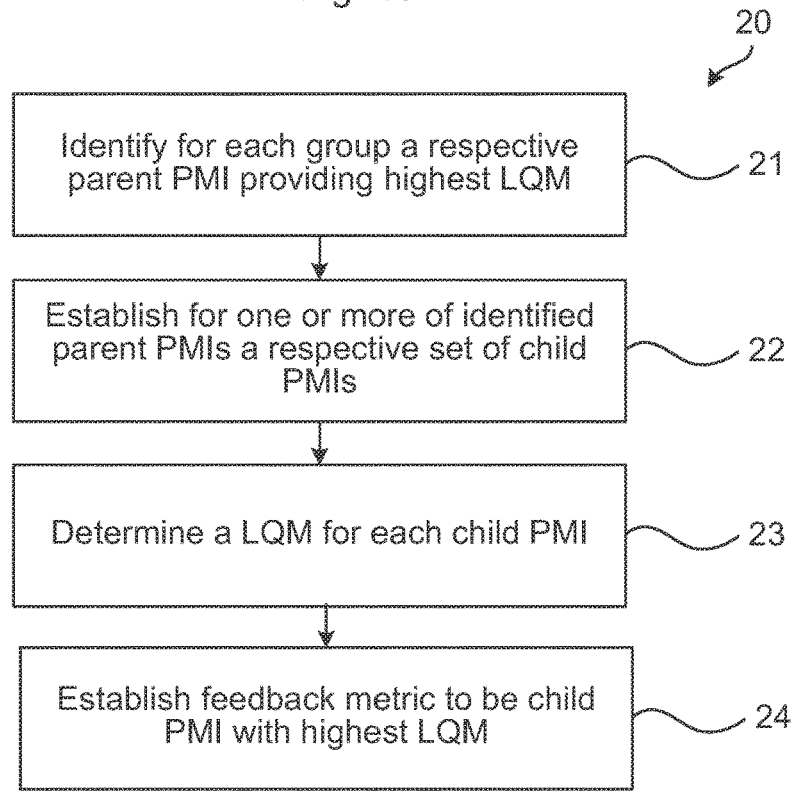
FIG. 16 illustrates a flow chart over steps of a method in a wireless device in accordance with the present disclosure.

FIG. 16 illustrates a flow chart over steps of a method in a wireless device in accordance with the present disclosure.

A method 20 is provided, which may be performed in a wireless device 12 for establishing a feedback metric. The wireless device 12 is configured with a grouping of available precoding matrix indicators (PMIs) of a codebook. The grouping comprises two or more groups $G_1, \ldots, G_N$, each of which comprises an exclusive subset of the available precoding matrix indicators (PMIs).

The method 20 may for instance be performed in a CSI estimator of the wireless device 12, and in response to receiving and decoding a MIMO stream. For instance, upon receiving a reference signal, the wireless device 12 may compute a channel estimate and subsequently the PMI.

The method 20 comprises identifying 21 for each of one or more rank indicator, RI, hypotheses a respective parent PMI of the two or more groups $G_1, \ldots, G_N$ providing the highest link quality metric, LQM. That is, the parent PMI providing the highest link quality metric is found.

The method 20 comprises establishing 22 for one or more of the identified parent PMIs, a respective set of child PMIs.

The method 20 comprises determining 23 a link quality metric, LQM for each child PMIs of the established one or more sets of child PMIs.

The method 20 comprises establishing 24 the feedback metric to be the child PMI having the highest link quality metric, LQM. The feedback metric may be included in a feedback report to a node, e.g. eNB.

The method 20 significantly reduces the complexity of finding a suitable PMI for inclusion in a feedback report, which may be sent to a receiving node such as eNB. This reduction in complexity is enabled with a negligible degradation compared to a prior art full search. The battery life time of the wireless device 12 is thereby prolonged. Further, the wireless device can be provided with hardware resources such as memory and processing units that are less costly or enabling it to instead execute additional procedures, such as inter-RAT (Radio Access Technology) in parallel with CSI estimation.

In an embodiment, the establishing 22 comprises establishing a respective set of child PMIs for the identified parent PMI of each group $G_1, \ldots, G_N$ of the grouping. One PMI in each group $G_1, \ldots, G_N$ corresponding to a certain. RI hypothesis is identified as the best PMI in the group.

In a variation of the above embodiment, the determining 23 comprises determining a respective link quality metric, LQM, for all child PMIs of the respective sets of child PMIs of each identified parent PMI. Only the children PMIs of the best PMI in each group is searched over, which is a great reduction in calculations compared to prior art.

In an embodiment, the determining 22 comprises determining a respective link quality metric, LQM, for each child PMIs only for the parent PMI, among the identified respective parent PMIs, having the highest link quality metric, LQM. In this embodiment, the child PMIs that are searched over only comprises the child PMIs for the best parent PMI. This provides is a still further reduced amount of calculations compared to the previous embodiments.

In an embodiment, the establishing 24 the feedback metric further comprises establishing a rank indicator, RI, to he the rank indicator, RI, hypothesis corresponding to the group $G_1, \ldots, G_N$ to which the parent PMI belongs which has the child PMI having the highest link quality metric, LQM. A feedback report sent e.g. to a eNB may thus comprise the PMI as well as the RI.

In an embodiment, the identifying 21 for each group $G_1, \ldots, G_N$ a respective parent PMI providing the highest link quality metric, LQM, comprises:
  determining for each parent PMI of each of the one or more groups $G_1, \ldots, G_N$ a respective post-processing signal to interference plus noise ratio, SINR, or a respective signal to interference plus noise ratio, SINR,
  determining for each parent PMI a respective link quality metric, LQM, based on the respective determined post-processing signal to interference plus noise ratios, SINRs, or the respective signal to interference plus noise ratios, SINRs, and
  identifying the parent PMI of each group $G_1, \ldots, G_N$ having the highest link quality metric, LQM.

In an embodiment, the identifying 21 for each group $G_1, \ldots, G_N$ a respective parent PMI providing the highest link quality metric, LQM, comprises receiving from a network node n a configuration indicating in a bitmap pattern the respective parent PMI. The wireless device 12 receiving such bitmap pattern is relieved from finding the best parent PMIs, thus further reducing the calculations required.

In an embodiment, the establishing 22 for one or more of the identified parent PMIs, a respective set of child PMIs, comprises using a phase shifting equation, relating a child PMI to its parent PMI.

In a variation of the above embodiment, the wireless device 12 is adapted to receive up to four precoded multiple-input, multiple output, MIMO, streams and wherein the phase shifting equation comprises:

$$u_c = \begin{bmatrix} 1 & 0 & 0 & 0 \\ 0 & \exp(jκθ) & 0 & 0 \\ 0 & 0 & \exp(j2κθ) & 0 \\ 0 & 0 & 0 & \exp(j3κθ) \end{bmatrix} u_p, κ = c - p, c \neq p,$$

$$\{c, p\} \in \{0, 1, \ldots 15\}, θ = [-π, π].,$$

wherein $u_c$ comprises a set of child PMIs and $u_p$ comprises a parent PMI.

Figure 17:
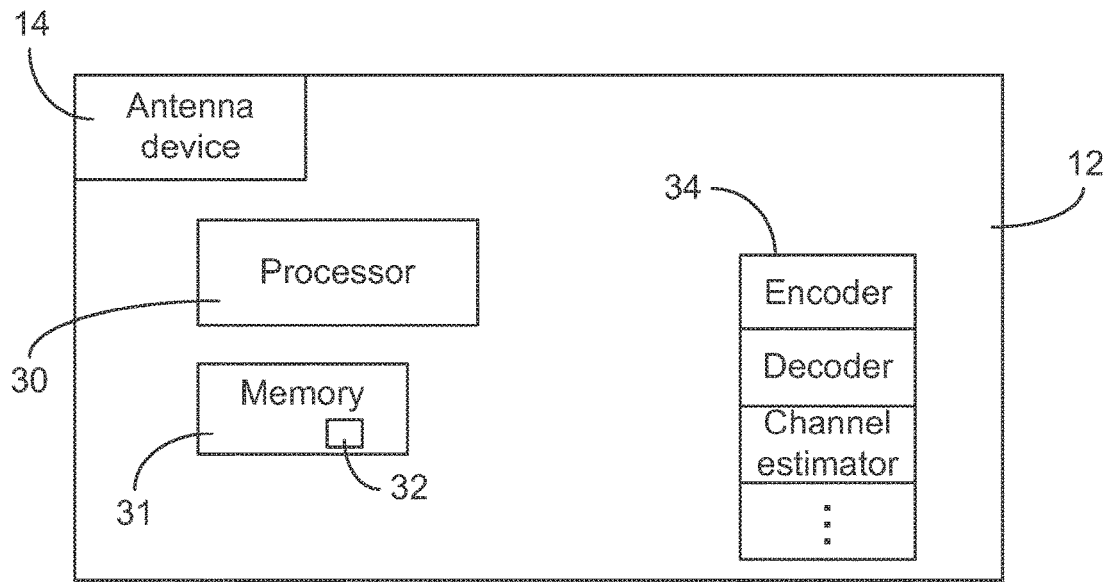
FIG. 17 illustrates schematically a wireless device and means for implementing embodiments of the present disclosure.

FIG. 17 illustrates schematically a wireless device and means for implementing embodiments of the present disclosure. The various embodiments of the method 20 as described e.g. in relation to FIG. 16 may be implemented in a wireless device 12, e.g. comprising a smart phone, tablet computer etc.

The wireless device 12 comprises a processor 30 comprising any combination of one or more of a central processing unit (CPU), multiprocessor, microcontroller, digital signal processor (DSP), application specific integrated circuit etc. capable of executing software instructions stored in a memory 31, which can thus be a computer program product 31. The processor 30 can be configured to execute any of the various embodiments of the method for instance as described in relation to FIG. 16.

The memory 31 can be any combination of read and write memory (RAM) and read only memory (ROM), Flash memory, magnetic tape, Compact Disc (CD)-ROM, digital versatile disc (DVD), Blu-ray disc etc. The memory 31 also comprises persistent storage, which, for example, can be any single one or combination of magnetic memory, optical memory, solid state memory or even remotely mounted memory.

The wireless device 12 also comprises an antenna device 14, in particular a MIMO enabled antenna device comprising two or more antenna elements. The antenna device 14 is able to send and receive wireless signals, in particular radio signals.

The wireless device 12 also comprises means for handling the signals received by the antenna device 12, and for handling signals to be transmitted by the antenna device 12. Such means, indicated collectively at reference numeral 34, comprise for instance encoder, decoder, channel estimator, mapper, demapper, interleaver, deinterleaver, CSI estimator, FFT devices, IFFT devices etc. Such components are known within the art and are not described in more detail herein.

A wireless device 12 is provided for establishing a feedback metric. The wireless device is configured with a grouping of available precoding matrix indicators, PMIs, of a codebook. The grouping comprises two or more groups $G_1, \ldots, G_N$ each of which comprises an exclusive subset of the available precoding matrix indicators, PMIs. The wireless device 12 is configured to:
  identify for each of one or more rank indicator, RI, hypotheses, a respective parent PMI of the two or more groups $G_1, \ldots, G_N$ providing the highest link quality metric, LQM,
  establish for one or more of the identified parent PMIs, a respective set of child PMIs,
  determine a link quality metric, LQM for each child PMIs of the established one or more sets of child PMIs, and
  establish the feedback metric to be the child PMI having the highest link quality metric, LQM.

The wireless device 12 may be configured to perform the above steps e.g. by comprising a processor 30 and memory 31, the memory 31 containing instructions executable by the processor 30, whereby the wireless device 12 is operative to perform the steps.

In an embodiment, the wireless device 12 is configured to establish a respective set of child PMIs by establishing a respective set of child PMIs for the identified parent PMI of each group $G_1, \ldots, G_N$ of the grouping.

In an embodiment, the wireless device 12 is configured to determine by determining a respective link quality metric, LQM, for all child PMIs of the respective sets of child PMIs of each identified parent PMI.

In an embodiment, the wireless device 12 is configured to determine by determining a respective link quality metric, LQM, for each child PMIs only for the parent PMI, among the identified respective parent PMIs, having the highest link quality metric, LQM.

In an embodiment, the wireless device 12 is configured to further establish a rank indicator, RI, to be the rank indicator, RI, hypothesis corresponding to the group $G_1, \ldots, G_N$ to which the parent PMI belongs which has the child PMI having the highest link quality metric, LQM.

In an embodiment, the wireless device 12 is configured to identify for each group $G_1, \ldots, G_N$ a respective parent PMI providing he highest link quality metric, by:
  determining for each parent PMI of each of the one or more groups $G_1, \ldots, G_N$ a respective post-processing signal to interference plus noise ratio, SINR, or a respective signal to interference plus noise ratio, SINR, determining for each parent PMI a respective link quality metric, LQM, based on the respective determined post-processing signal to interference plus noise ratios, SINRs, or the respective signal to interference plus noise ratios, SINRs, and identifying the parent PMI of each group $G_1, \ldots, G_N$ having the highest link quality metric, LQM.

In an embodiment, the wireless device 12 is configured to identify for each group $G_1, \ldots, G_N$ a respective parent PMI providing the highest link quality metric, LQM, by receiving from a network node n a configuration indicating in a bitmap pattern the respective parent PMI.

In an embodiment, the wireless device 12 is configured to establish for one or more of the identified parent PMIs, a respective set of child PMIs, by using a phase shifting equation, relating a child PMI to its parent PMI.

In a variation of the above embodiment, the wireless device 12 is adapted to receive up to four precoded multiple-input, multiple output, MIMO, streams and wherein the phase shifting equation comprises:

$$u_c = \begin{bmatrix} 1 & 0 & 0 & 0 \\ 0 & \exp(jk\theta) & 0 & 0 \\ 0 & 0 & \exp(j2\kappa\theta) & 0 \\ 0 & 0 & 0 & \exp(j3\kappa\theta) \end{bmatrix} u_p, \kappa = c - p, c \neq p,$$

$$\{c, p\} \in \{0, 1, \ldots 15\}, \theta = [-\pi, \pi].,$$

wherein $u_c$ comprises a set of child PMIs and $u_p$ comprises a parent PMI.

The present disclosure also encompasses a computer program product 31 comprising a computer program 32 for implementing the embodiments of the method as described, and a computer readable means on which the computer program 32 is stored. The computer program product 31 may, as mentioned earlier, be any combination of random access memory (RAM) or read only memory (ROM), Flash memory, magnetic tape, Compact Disc (CD)-ROM, digital versatile disc (DVD), Blu-ray disc etc.

The present disclosure comprises a computer program 32 for a wireless device 12 for establishing a feedback metric. The computer program 32 comprises computer program code, which, when executed on at least one processor on the wireless device 12 causes the wireless device 12 to perform the method 20 according to any of the described embodiments thereof.

A computer program product 31 comprising a computer program 32 as described above and a computer readable means on which the computer program 32 is store also provided.

The computer program product, or the memory, thus comprises instructions executable by the processor 30. Such instructions may be comprised in a computer program, or in one or more software modules or function modules.

Figure 18:
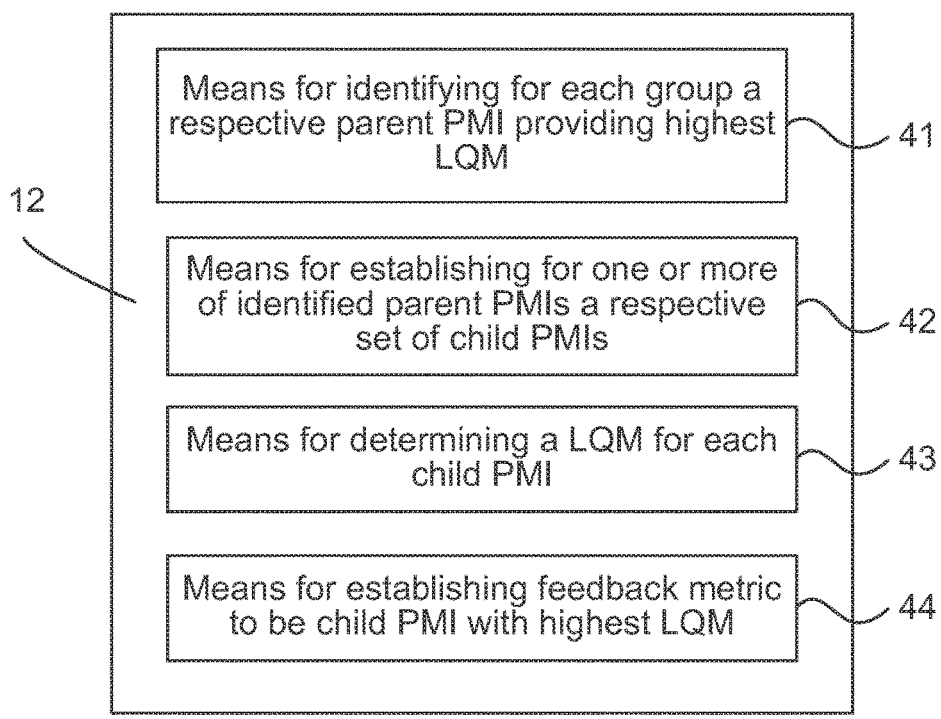
FIG. 18 illustrates a wireless device comprising function modules/software modules for implementing embodiments of the present disclosure.

FIG. 18 illustrates an implementation of the wireless device using function modules/software modules for implementing embodiments of the present disclosure. In particular, FIG. 18 illustrates a wireless device 12 comprising function modules for implementing embodiments of the method of the present disclosure.

The wireless device 12 comprises first means 41 for identifying for one or more rank indicator hypotheses a respective parent PMI of two or more groups of exclusive subsets of available PMIs providing highest LQM. Such first means 41 may for example comprise processing circuitry adapted to perform the identification by using program code stored in a memory.

The wireless device 12 comprises second means 42 for establishing for one or more of identified parent PMIs a respective set of child PMIs. Such second means 42 may for example comprise processing circuitry adapted to perform the establishing by using program code stored in a memory.

The wireless device 12 comprises third means 43 for determining a LQM for each child PMI. Such third means 43 may for example comprise processing circuitry-adapted to perform the determining by using program code stored in a memory.

The wireless device 12 comprises fourth means 44 for establishing feedback metric to be child PMI with highest LQM. Such fourth means 44 may for example comprise processing circuitry adapted to perform the establishing by using program code stored in a memory.

The wireless device 12 may comprise still further means for implementing the various features of the method as have been described.

The means 41, 42, 43, 44, comprising e.g. function modules, can be implemented using software instructions such as computer program executing in a processor and/or using hardware, such as application specific integrated circuits, field programmable gate arrays, discrete logical components etc., or any combination thereof.

Figure 19:
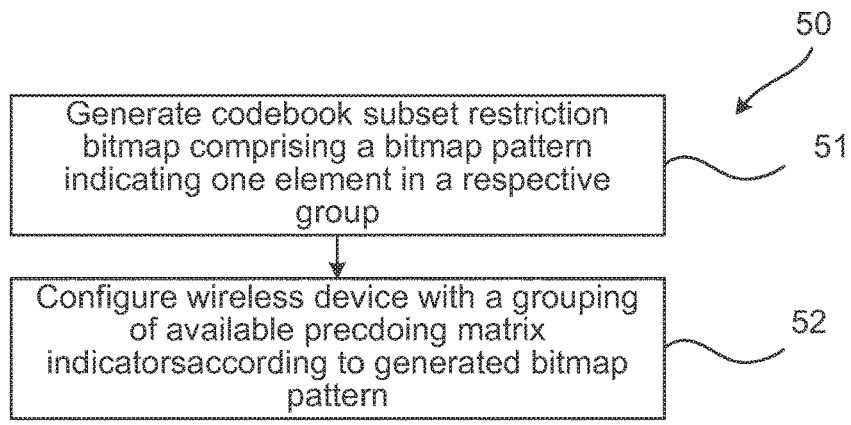
FIG. 19 illustrates a flow chart over steps of a method in a network node in accordance with the present disclosure.

FIG. 19 illustrates a flow chart over steps of a method in a network node in accordance with the present disclosure. The method 50 may be performed in a network node n such as an eNB for configuring a wireless device 12 to provide a feedback metric.

The method 50 comprises generating 51 a codebook subset restriction bitmap comprising a bitmap pattern indicating one element in a respective group $G_1, \ldots, G_N$. Each group comprises an exclusive subset of all available precoding matrix indicators, PMIs, of a codebook.

The method 50 comprises configuring 52 the wireless device 12 with a grouping of the available precoding matrix indicators, PMIs, according to the generated bitmap pattern.

In different embodiments, the configuring 52 comprises signaling the generated bitmap pattern using higher layer signaling or using radio resource control signaling.

Figure 20:
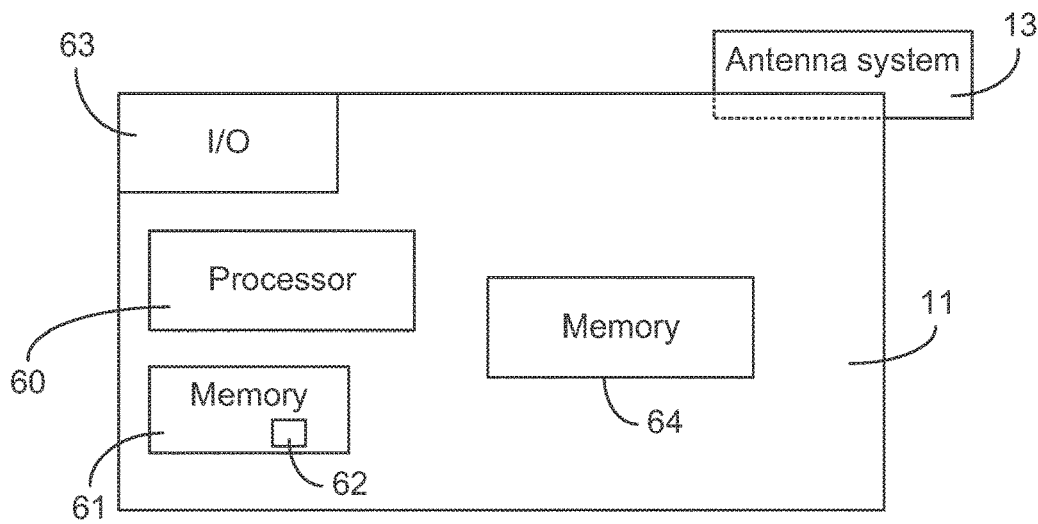
FIG. 20 illustrates schematically a network node and means for implementing embodiments of the present disclosure.

FIG. 20 illustrates schematically a network node and means for implementing embodiments of the present disclosure. The various embodiments of the method 50 as described e.g. in relation to FIG. 19 may be implemented in the network node 11.

The network node n comprises a processor 60 comprising any combination of one or more of a central processing unit (CPU), multiprocessor, microcontroller, digital signal processor (DSP), application specific integrated circuit etc. capable of executing software instructions stored in a memory 61, which can thus be a computer program product 61. The processor 60 can be configured to execute any of the various embodiments of the method for instance as described in relation to FIG. 19.

The memory 61 can be any combination of read and write memory (RAM) and read only memory (ROM), Flash memory, magnetic tape, Compact Disc (CD)-ROM, digital versatile disc (DVD), Blu-ray disc etc. The memory 61 also comprises persistent storage, which, for example, can be any single one or combination of magnetic memory, optical memory, solid state memory or even remotely mounted memory.

A data memory 64 may also be provided for reading and/or storing data during execution of software instructions in the processor 60. The data memory 64 can for instance be any combination of random access memory (RAM) and read only memory (ROM).

The network node 11 may also comprise an input/output device 63 (indicated by I/O in the figure) for communicating with other network nodes. Such input/output device 63 may for instance comprise a communication interface.

The network node if further comprises or controls an antenna system 13, in particular a MIMO antenna system. Such antenna system 13 may comprise a large number of antenna elements.

The network node 11 further comprises processing circuitry and devices, for handling various functions conventionally performed in such network node, in particular means for handling MIMO operation. Such means comprise for instance decoders, precoders, encoders, receiving circuitry, transmitting circuitry etc., which are all well known in the art and will not be described further in the present disclosure.

A network node if is provided for configuring a wireless device 12 to provide a feedback metric. The network node 11 is configured to:
generate a codebook subset restriction bitmap comprising a bitmap pattern indicating one element in a respective group $G_1, \ldots, G_N$ each of which comprises an exclusive subset of all available precoding matrix indicators, PMIs, of a codebook, and
configure a wireless device 12 with a grouping of all available precoding matrix indicators, PMIs, according to the generated bitmap pattern.

The network node 11 may be configured to perform the above steps e.g. by comprising a processor 60 and memory 61, the memory 61 containing instructions executable by the processor 60, whereby the network node 11 is operative to perform the steps.

In different embodiments, the network node 11 is configured to configure the wireless device 12 by signaling the generated bitmap pattern using higher layer signaling or using radio resource control signaling.

The present disclosure also encompasses a computer program product 61 comprising a computer program 62 for implementing the embodiments of the method as described, and a computer readable means on which the computer program 62 is stored. The computer program product 61 may, as mentioned earlier, be any combination of random access memory (RAM) or read only memory (ROM), Flash memory, magnetic tape, Compact Disc (CD)-ROM, digital versatile disc (DVD), Blu-ray disc etc.

The present disclosure thus comprises a computer program 62 for a network node 11 for configuring a wireless device 12 to provide a feedback metric. The computer program 62 comprises computer program code, which, when executed on at least one processor on the network node n causes the network node 11 to perform the method 50 according to any of the described embodiments thereof.

A computer program product 61 comprising a computer program 62 as described above and a computer readable means on which the computer program 62 is stored is also provided.

The computer program product, or the memory, thus comprises instructions executable by the processor 60. Such instructions may be comprised in a computer program, or in one or more software modules or function modules.

Figure 21:
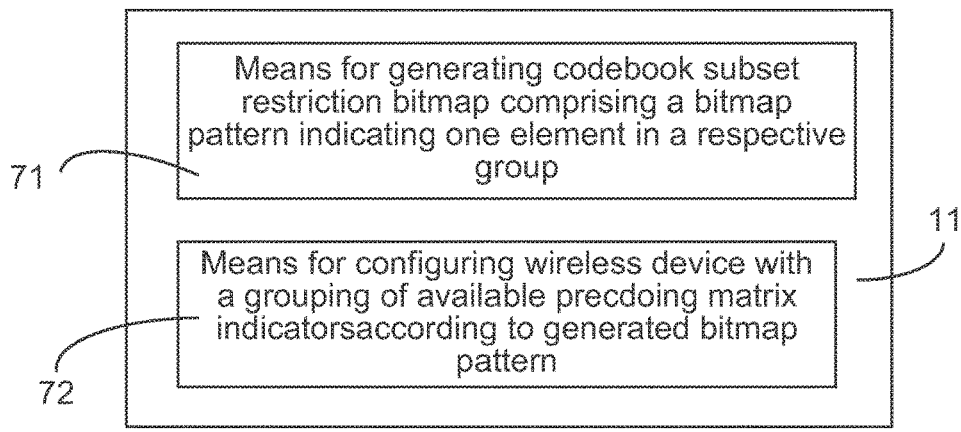
FIG. 21 illustrates a network node comprising function modules/software modules for implementing embodiments of the present disclosure.

FIG. 21 illustrates an example of an implementation of the network node 11 using function modules and/or software modules. In particular, FIG. 21 illustrates a network node n comprising function modules for implementing embodiments of the method of the present disclosure.

The network node 11 comprises first means 71, for example a first function module, for generating a codebook subset restriction bitmap comprising a bitmap pattern indicating one element in a respective group $G_1, \ldots, G_N$ each of which comprises an exclusive subset of all available precoding matrix indicators, PMIs, of a codebook. Such means 71 may for example comprise processing circuitry adapted to generate the codebook subset restriction bitmap by using program code stored in a memory.

The network node n comprises second means 72, for example a second function module, for configuring a wireless device 12 with a grouping of all available precoding matrix indicators, PMIs, according to the generated bitmap pattern. Such means 72 may for example comprise processing circuitry adapted to perform such configuring by using program code stored in a memory.

The network node 11 may comprise still further means for implementing the various features of the method as have been described.

The means 71, 72, e.g. function modules, can be implemented using software instructions such as computer program executing in a processor and/or using hardware, such as application specific integrated circuits, field programmable gate arrays, discrete logical components etc., or any combination thereof.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method performed in a wireless device for establishing a feedback metric, wherein the wireless device is configured with a grouping of available precoding matrix indicators (PMIs) of a codebook having a symmetrical structure, the grouping comprising two or more groups each of which comprises an exclusive subset of the available precoding matrix indicators (PMIs) the method comprising:
identifying for each of one or more rank indicator (RI) hypotheses, a respective parent PMI of the two or more groups providing a highest link quality metric (LQM);
establishing for one or more of the identified parent PMIs of the two or more groups, a respective set of child PMIs wherein a child PMI generating vector is obtainable by a linear transformation of a parent PMI generating vector defined from the codebook, where the linear transformation is a diagonal matrix comprising the appropriate phase shifters;
determining a link quality metric (LQM) for each child PMIs of the established one or more sets of child PMIs; and
establishing the feedback metric to be the child PMI having the highest link quality metric (LQM).

2. The method as claimed in claim 1, wherein the establishing comprises establishing a respective set of child PMIs for the identified parent PMI of each group of the grouping.

3. The method as claimed in claim 2, wherein the determining comprises determining a respective link quality metric (LQM) for all child PMIs of the respective sets of child PMIs of each identified parent PMI.

4. The method as claimed in claim 1, wherein the determining comprises determining a respective link quality metric (LQM) for each child PMIs only for the parent PMI, among the identified respective parent PMIs, having the highest link quality metric (LQM).

5. The method as claimed in claim 1, wherein the establishing the feedback metric further comprises establishing a rank indicator (RI) to be the rank indicator (RI) hypothesis corresponding to the group to which the parent PMI belongs which has the child PMI having the highest link quality metric (LQM).

6. The method as claimed in claim 1, wherein the identifying for each group a respective parent PMI providing the highest link quality metric (LQM) comprises:
   determining for each parent PMI of each of the one or more groups a respective post-processing signal to interference plus noise ratio (SINR) or a respective signal to interference plus noise ratio (SINR);
   determining for each parent PMI a respective link quality metric (LQM) based on the respective determined post-processing signal to interference plus noise ratios (SINRs) or the respective signal to interference plus noise ratios (SINRs); and
   identifying the parent PMI of each group having the highest link quality metric (LQM).

7. The method as claimed in claim 1, wherein the identifying for each group a respective parent PMI providing the highest link quality metric (LQM) comprises receiving from a network node a configuration indicating in a bitmap pattern the respective parent PMI.

8. The method as claimed in claim 1, wherein the wireless device is adapted to receive up to four precoded multiple-input, multiple output (MIMO) streams and wherein the diagonal matrix comprising the appropriate phase shifters comprises:

$$u_c = \begin{bmatrix} 1 & 0 & 0 & 0 \\ 0 & \exp(jk\theta) & 0 & 0 \\ 0 & 0 & \exp(j2\kappa\theta) & 0 \\ 0 & 0 & 0 & \exp(j3\kappa\theta) \end{bmatrix} u_p, \kappa = c - p, c \neq p,$$

$$\{c, p\} \in \{0, 1, \ldots 15\}, \theta = [-\pi, \pi],$$

wherein $u_c$ comprises a set of child PMIs and $u_p$ comprises a parent PMI.

9. A wireless device for establishing a feedback metric, wherein the wireless device is configured with a grouping of available precoding matrix indicators (PMIs) of a codebook having a symmetrical structure, the grouping comprising two or more groups each of which comprises an exclusive subset of the available precoding matrix indicators (PMIs) the wireless device comprising:
   a processor; and
   an antenna device,
   wherein the wireless device is configured to:
   identify for each of one or more rank indicator (RI) hypothesis a respective parent PMI of the two or more groups providing a highest link quality metric (LQM);
   establish for one or more of the identified parent PMIs of the two or more groups, a respective set of child PMIs, wherein a child PMI generating vector is obtainable by a linear transformation of a parent PMI generating vector defined from the codebook, where the linear transformation is a diagonal matrix comprising the appropriate phase shifters;
   determine a link quality metric (LQM) for each child PMIs of the established one or more sets of child PMIs; and
   establish the feedback metric to be the child PMI having the highest link quality metric (LQM).

10. The wireless device as claimed in claim 9, configured to establish a respective set of child PMIs by establishing a respective set of child PMIs for the identified parent PMI of each group of the grouping.

11. The wireless device as claimed in claim 10, configured to determine by determining a respective link quality metric (LQM) for all child PMIs of the respective sets of child PMIs of each identified parent PMI.

12. The wireless device as claimed in claim 9, configured to determine by determining a respective link quality metric (LQM) for each child PMIs only for the parent PMI, among the identified respective parent PMIs, having the highest link quality metric (LQM).

13. The wireless device as claimed in claim 9, configured to further establish a rank indicator (RI) to be the rank indicator (RI) hypothesis corresponding to the group to which the parent PMI belongs which has the child PMI having the highest link quality metric (LQM).

14. The wireless device as claimed in claim 9, configured to identify for each group a respective parent PMI providing the highest link quality metric (LQM) by:
   determining for each parent PMI of each of the one or more groups a respective post-processing signal to interference plus noise ratio (SINR) or a respective signal to interference plus noise ratio (SINR);
   determining for each parent PMI a respective link quality metric (LQM) based on the respective determined post-processing signal to interference plus noise ratios (SINRs) or the respective signal to interference plus noise ratios (SINRs); and
   identifying the parent PMI of each group having the highest link quality metric (LQM).

15. The wireless device as claimed in claim 9, configured to identify for each group a respective parent PMI providing the highest link quality metric (LQM) by receiving from a network node a configuration indicating in a bitmap pattern the respective parent PMI.

16. The wireless device as claimed in claim 9, wherein the wireless device is adapted to receive up to four precoded multiple-input, multiple output (MIMO) streams and wherein the diagonal matrix comprising the appropriate phase shifters comprises:

$$u_c = \begin{bmatrix} 1 & 0 & 0 & 0 \\ 0 & \exp(jk\theta) & 0 & 0 \\ 0 & 0 & \exp(j2\kappa\theta) & 0 \\ 0 & 0 & 0 & \exp(j3\kappa\theta) \end{bmatrix} u_p, \kappa = c - p, c \neq p,$$

$$\{c, p\} \in \{0, 1, \ldots 15\}, \theta = [-\pi, \pi],$$

wherein $u_c$ comprises a set of child PMIs and $u_p$ comprises a parent PMI.

17. A nontransitory computer readable medium comprising a computer program for a wireless device for establishing a feedback metric, the computer program comprising computer program code, which, when executed in a processor of the wireless device causes the wireless device to perform a method, wherein the wireless device is configured with a grouping of available precoding matrix indicators (PMIs) of a codebook having a symmetrical structure, the grouping comprising two or more groups each of which comprises an exclusive subset of the available precoding matrix indicators (PMIs) and wherein the method comprises:

identifying for each of one or more rank indicator (RI) hypotheses, a respective parent PMI of the two or more groups providing a highest link quality metric (LQM);

establishing for one or more of the identified parent PMIs of the two or more groups, a respective set of child PMIs wherein a child PMI generating vector is obtainable by a linear transformation of a parent PMI generating vector defined from the codebook, where the linear transformation is a diagonal matrix comprising the appropriate phase shifters;

determining a link quality metric (LQM) for each child PMIs of the established one or more sets of child PMIs; and establishing the feedback metric to be the child PMI having the highest link quality metric (LQM).

* * * * *